US012314176B2

(12) United States Patent
Lee

(10) Patent No.: US 12,314,176 B2
(45) Date of Patent: May 27, 2025

(54) STORAGE SYSTEM AND METHOD PROVIDING CACHE AREA IN MEMORY INCLUDED IN HOST DEVICE

(71) Applicant: Samsung Electronics Co., Ltd., Suwon-si (KR)

(72) Inventor: Youngmin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 63 days.

(21) Appl. No.: 18/198,511

(22) Filed: May 17, 2023

(65) Prior Publication Data

US 2024/0095166 A1 Mar. 21, 2024

(30) Foreign Application Priority Data

Sep. 21, 2022 (KR) ........................ 10-2022-0119541

(51) Int. Cl.
*G06F 12/0802* (2016.01)
*G06F 3/06* (2006.01)

(52) U.S. Cl.
CPC ........ *G06F 12/0802* (2013.01); *G06F 3/0613* (2013.01); *G06F 3/0659* (2013.01); *G06F 3/0673* (2013.01); *G06F 2212/305* (2013.01)

(58) Field of Classification Search
CPC .. G06F 12/0802; G06F 3/0613; G06F 3/0659; G06F 3/0673; G06F 2212/305; G06F 3/061; G06F 3/0656; G06F 3/0679; G06F 2212/311; G06F 2212/7203; G06F 12/0868; G06F 12/0873; G06F 12/126; G06F 12/0246; G06F 12/0893; G06F 2212/1016
See application file for complete search history.

(56) References Cited

U.S. PATENT DOCUMENTS

| | | | |
|---|---|---|---|
| 8,776,158 B1 | 7/2014 | Cote et al. |
| 8,832,354 B2 | 9/2014 | Sokolov et al. |
| 9,176,673 B2 | 11/2015 | Watanabe |
| 10,089,212 B2 | 10/2018 | Iwai |
| 10,176,096 B2 | 1/2019 | Vaidhyanathan et al. |

(Continued)

FOREIGN PATENT DOCUMENTS

EP 3 995 968 A1 5/2022

OTHER PUBLICATIONS

Communication issued on Feb. 7, 2024 by the European Patent Office for European Patent Application No. 23180001.2.

*Primary Examiner* — Francisco A Grullon
(74) *Attorney, Agent, or Firm* — Sughrue Mion, PLLC

(57) ABSTRACT

Provided is a method of operating a storage system including a host device and a storage device, the method including: transmitting, by the host device, a first write command and a logical address to the storage device; transmitting, by the storage device, first normal offset information about a normal area and first cache offset information about a cache area included in a host memory of the host device to the host device; copying, by the host device, first write data stored in the normal area to the cache area based on the first normal offset information and the first cache offset information; and transmitting, by the storage device, a first response to the first write command to the host device, wherein reception of the first write data from the host device before transmitting the first response is omitted.

20 Claims, 24 Drawing Sheets

(56) References Cited

U.S. PATENT DOCUMENTS

| | | | |
|---|---|---|---|
| 11,249,911 B2 | 2/2022 | Kim et al. | |
| 11,275,527 B1 | 3/2022 | Spector et al. | |
| 11,327,684 B2 | 5/2022 | Sela et al. | |
| 2015/0058557 A1* | 2/2015 | Madhusudana | G06F 3/0655 711/114 |
| 2015/0356020 A1* | 12/2015 | Desai | G06F 12/0897 711/103 |
| 2016/0026406 A1 | 1/2016 | Hahn et al. | |
| 2020/0045125 A1 | 2/2020 | Glimcher et al. | |
| 2020/0174865 A1 | 6/2020 | Kim | |
| 2020/0225868 A1 | 7/2020 | Dalmatov et al. | |
| 2021/0034235 A1 | 2/2021 | Kucherov et al. | |
| 2021/0374079 A1* | 12/2021 | Shin | G06F 13/382 |

* cited by examiner

FIG. 10

| LBA | ofs_N | ofs_C | PGM unit | STR ID |
|---|---|---|---|---|
| LBA1 | ofs_N1 | ofs_C1 | QLC | STR1 |
| ⋮ | ⋮ | ⋮ | ⋮ | ⋮ |
| LBAn | ofs_Nn | ofs_Cn | TLC | STRn |

L2C MAP

FIG. 13A

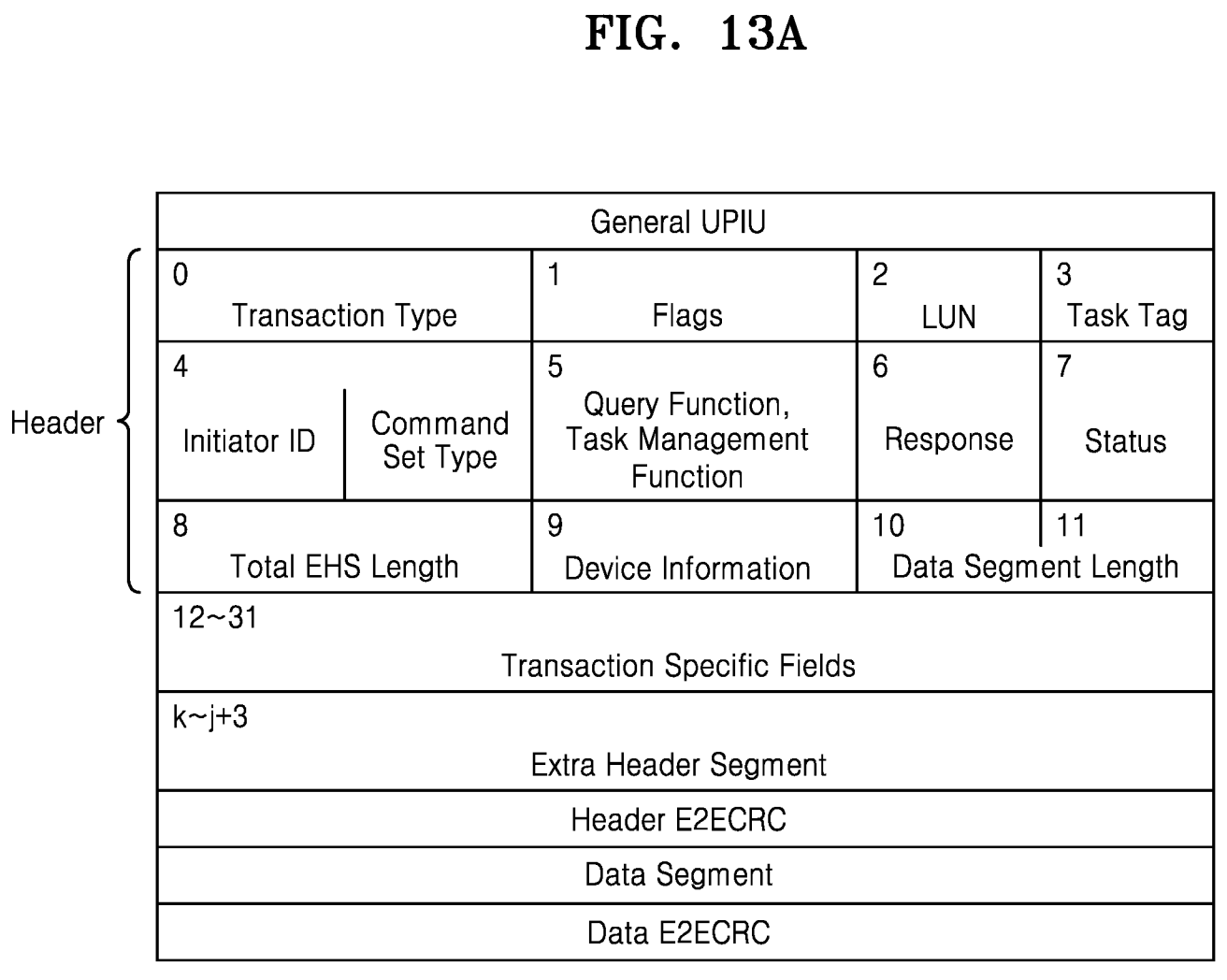

| | General UPIU | | | |
|---|---|---|---|---|
| Header | 0<br>Transaction Type | 1<br>Flags | 2<br>LUN | 3<br>Task Tag |
| Header | 4<br>Initiator ID \| Command Set Type | 5<br>Query Function, Task Management Function | 6<br>Response | 7<br>Status |
| Header | 8<br>Total EHS Length | 9<br>Device Information | 10 \| 11<br>Data Segment Length | |
| | 12~31<br>Transaction Specific Fields | | | |
| | k~j+3<br>Extra Header Segment | | | |
| | Header E2ECRC | | | |
| | Data Segment | | | |
| | Data E2ECRC | | | |

FIG. 13B

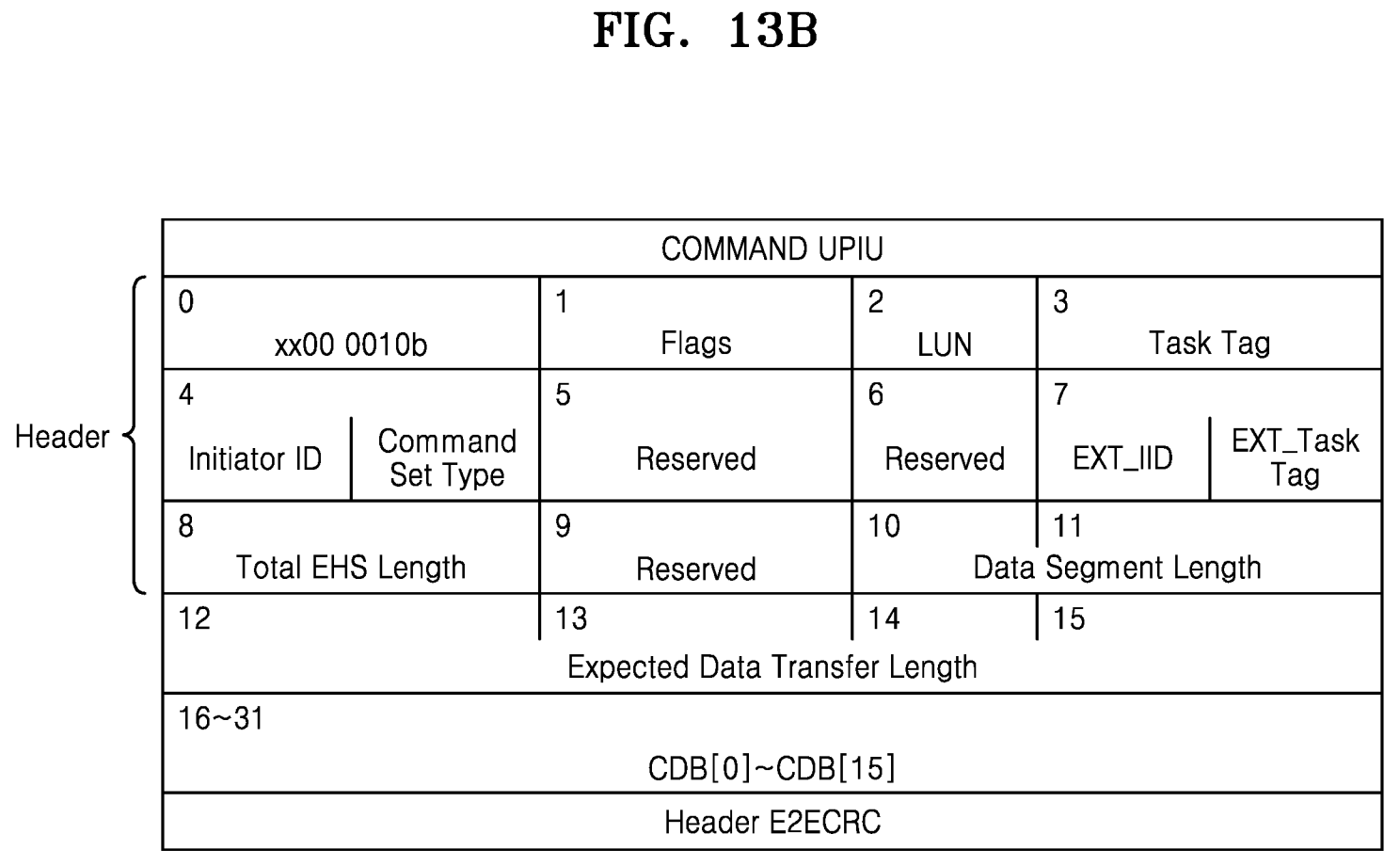

Header (bytes 0–11)

<table>
<tr><th colspan="8">COMMAND UPIU</th></tr>
<tr><td colspan="2">0<br>xx00 0010b</td><td colspan="2">1<br>Flags</td><td>2<br>LUN</td><td colspan="2">3<br>Task Tag</td></tr>
<tr><td>4<br>Initiator ID</td><td>Command Set Type</td><td colspan="2">5<br>Reserved</td><td>6<br>Reserved</td><td>7<br>EXT_IID</td><td>EXT_Task Tag</td></tr>
<tr><td colspan="2">8<br>Total EHS Length</td><td colspan="2">9<br>Reserved</td><td colspan="3">10 11<br>Data Segment Length</td></tr>
<tr><td colspan="7">12 13 14 15<br>Expected Data Transfer Length</td></tr>
<tr><td colspan="7">16~31<br>CDB[0]~CDB[15]</td></tr>
<tr><td colspan="7">Header E2ECRC</td></tr>
</table>

FIG. 13C

| RESPONSE UPIU | | | |
|---|---|---|---|
| 0<br>xx10 0001b | 1<br>Flags | 2<br>LUN | 3<br>Task Tag |
| 4<br>Initiator ID \| Command Set Type | 5<br>EXT_IID \| EXT_Task Tag | 6<br>Response | 7<br>Status |
| 8<br>Total EHS Length | 9<br>Device Information | 10<br>Data Segment Length | 11 |
| 12 | 13<br>Residual Transfer Count | 14 | 15 |
| 16~31<br>Reserved | | | |
| Header E2ECRC | | | |
| K<br>Sense Data Length | K+1 | K+2~K+19<br>Sense Data | |
| Data E2ECRC | | | |

Header (bytes 0–15)

FIG. 13D

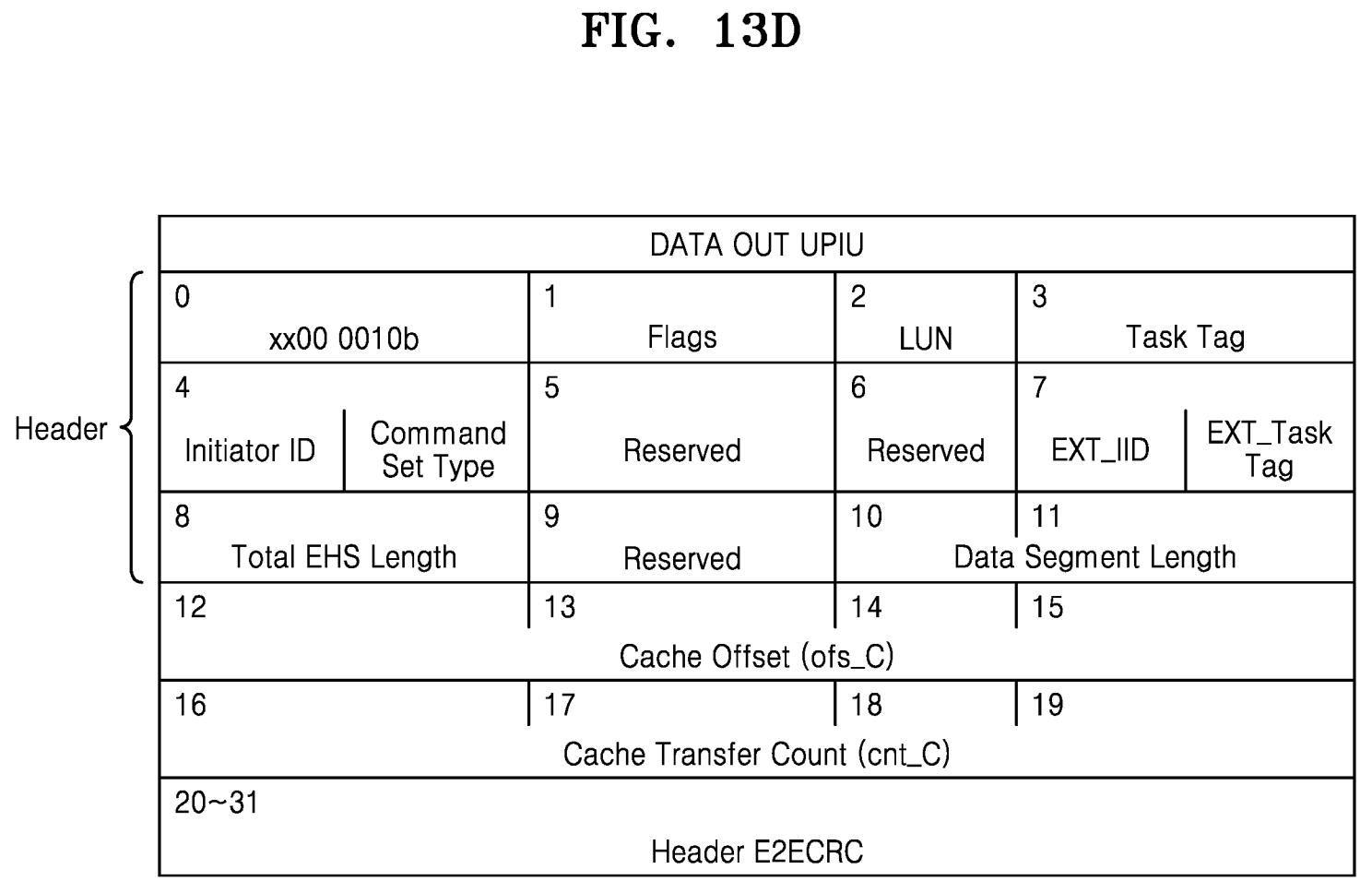

Header (bytes 0–11)

| DATA OUT UPIU | | | | | | |
|---|---|---|---|---|---|---|
| 0 xx00 0010b | | 1 Flags | 2 LUN | 3 Task Tag | | |
| 4 Initiator ID | Command Set Type | 5 Reserved | 6 Reserved | 7 EXT_IID | EXT_Task Tag | |
| 8 Total EHS Length | | 9 Reserved | 10 Data Segment Length | 11 | | |
| 12 Cache Offset (ofs_C) | | 13 | 14 | 15 | | |
| 16 Cache Transfer Count (cnt_C) | | 17 | 18 | 19 | | |
| 20~31 Header E2ECRC | | | | | | |

FIG. 13E

| DATA IN UPIU | | | |
|---|---|---|---|
| 0<br>xx10 0010b | 1<br>Flags | 2<br>LUN | 3<br>Task Tag |
| 4<br>Initiator ID \| Reserved | 5<br>EXT_IID \| Reserved | 6<br>Reserved | 7<br>EXT_Task Tag |
| 8<br>Total EHS Length | 9<br>Reserved | 10<br>Data Segment Length | 11 |
| 12 | 13<br>Cache Offset (ofs_C) | 14 | 15 |
| 16 | 17<br>Cache Transfer Count (cnt_C) | 18 | 19 |
| 20 | 21<br>Normal offset (ofs_N) | 22 | 23 |
| 24 | 25<br>Normal Transfer Count (cnt_N) | 26 | 27 |
| Reserved | | | |
| Header E2ECRC | | | |

Header (bytes 0–11)

FIG. 13F

DATA IN UPIU

| | | | |
|---|---|---|---|
| 0<br>xx11 0001b | 1<br>Flags | 2<br>LUN | 3<br>Task Tag |
| 4<br>Initiator ID \| Reserved | 5<br>Reserved | 6<br>Reserved | 7<br>EXT_Task Tag |
| 8<br>Total EHS Length | 9<br>Reserved | 10<br>Data Segment Length | 11 |
| 12 | 13<br>Cache Offset (ofs_C) | 14 | 15 |
| 16 | 17<br>Cache Transfer Count (cnt_C) | 18 | 19 |
| 20 | 21<br>Normal offset (ofs_N) | 22 | 23 |
| 24 | 25<br>Normal Transfer Count (cnt_N) | 26 | 27 |
| Reserved | | | |
| Header E2ECRC | | | |

Header (bytes 0–11)

STORAGE SYSTEM AND METHOD PROVIDING CACHE AREA IN MEMORY INCLUDED IN HOST DEVICE

CROSS-REFERENCE TO RELATED APPLICATION

This application is based on and claims priority under 35 U.S.C. § 119 to Korean Patent Application No. 10-2022-0119541, filed on Sep. 21, 2022, in the Korean Intellectual Property Office, the disclosure of which is incorporated by reference herein in its entirety.

BACKGROUND

Embodiments of the disclosure relate to a storage system, and more particularly, to a storage system using a host memory as a cache memory.

A non-volatile memory may retain stored data even when power thereto is cut off. Recently, a storage device including a flash-based nonvolatile memory such as an embedded Multi-Media Card (eMMC), a Universal Flash Storage (UFS), a Solid State Drive (SSD), and a memory cards has been widely used. and These storage devices are useful to store or move a large amount of data.

A data processing system including a storage device may be referred to as a storage system, and the storage system may include a host and a storage device. Hosts and storage devices may be connected to one another through a variety of interface standards.

SUMMARY

The disclosure relates to a storage system and method of operating the same, in which a host memory is also used as a cache memory, and a write operation or a read operation is completed without data transmission between a host device and a storage device, improved write speed and read speed may be provided.

According to an aspect of the disclosure, there is provided a method of operating a storage system including a host device and a storage device, the method including: transmitting, by the host device, a first write command and a logical address to the storage device; transmitting, by the storage device, first normal offset information about a normal area and first cache offset information about a cache area included in a host memory of the host device to the host device; copying, by the host device, first write data stored in the normal area to the cache area based on the first normal offset information and the first cache offset information; and omitting reception of the first write data from the host device and transmitting, by the storage device, a first response to the first write command to the host device, wherein a reception of the first write data from the host device before transmitting the first response is omitted.

According to another aspect of the disclosure, there is provided a storage system including a host device including a memory including a normal area and a cache area; and a storage device including a memory cell array, configured to receive a write command and a logical address from the host device, and to transmit first address information for the cache area to the host device, wherein the host device copies write data stored in the normal area to the cache area based on the first address information, wherein the storage device transmits a response to the write command to the host device before receiving the write data from the host device.

According to another aspect of the disclosure, there is provided a method of operating a storage system including a host device and a storage device, the method including: transmitting, by the host device, a first read command and a logical address to the storage device; transmitting, by the storage device, first normal offset information about a normal area and first cache offset information about a cache area, and read data in the cache area to the host device, wherein the normal area and the cache area are included in a host memory of the host device, storing, by the host device, the read data in the normal area and the cache area based on the first normal offset information and the first cache offset information, transmitting a second read command and the logical address to the storage device by the host device; transmitting, by the storage device, the first cache offset information to the host device; and copying, by the host device, the read data stored in the cache area to the normal area based on the first cache offset information.

BRIEF DESCRIPTION OF DRAWINGS

Embodiments of the disclosure will be more clearly understood from the following detailed description taken in conjunction with the accompanying drawings in which:

FIG. 10 is a diagram illustrating an L2C map according to an embodiment;

FIG. 13A is a diagram illustrating a data structure of a general UPIU according to an embodiment of the disclosure;

FIG. 13B is a diagram illustrating a data structure of a command UPIU according to an embodiment;

FIG. 13C is a diagram illustrating a data structure of a response UPIU according to an embodiment;

FIG. 13D is a diagram illustrating a data structure of a data-out UPIU according to an embodiment;

FIG. 13E is a diagram for explaining a data structure of data in UPIU according to an embodiment;

FIG. 13F is a diagram illustrating a data structure of an RTT UPIU according to an embodiment;

DETAILED DESCRIPTION OF EMBODIMENTS

Hereinafter, various embodiments of the disclosure will be described with reference to the accompanying drawings. As used herein, an expression "at least one of" preceding a list of elements modifies the entire list of the elements and does not modify the individual elements of the list. For example, an expression, "at least one of a, b, and c" should be understood as including only a, only b, only c, both a and b, both a and c, both b and c, or all of a, b, and c.

Figure 1:
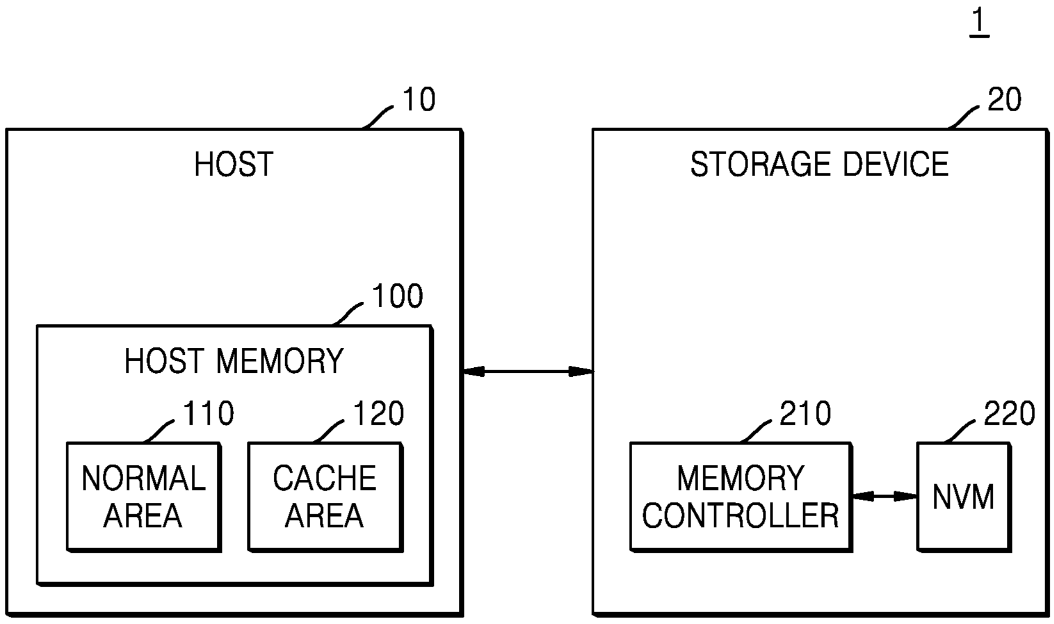
FIG. 1 is a block diagram illustrating a storage system according to an embodiment.

FIG. 1 is a block diagram illustrating a storage system according to an embodiment.

Referring to FIG. 1, a storage system 1 may include a host 10 and a storage device 20.

The host 10 may include a host memory 100. The host memory 100 may include at least one of a dynamic random access memory (DRAM), a static random access memory (SRAM), and a non-volatile memory. The host memory 100 may store at least one command or program executed by the host 10. Furthermore, the host memory 100 may store data to be provided to the storage device 20 or data provided from the storage device 20.

The host memory 100 may include a normal area 110 and a cache area 120. The normal area 110 may store write data to be provided to the storage device 20 or read data received from the storage device 20. The normal area 110 may include a write normal area in which write data is stored and a read normal area in which read data is stored. The cache area 120 may also store write data and read data according to a request from the storage device 20. According to a request from the storage device 20, write data stored in the normal area 110 may be copied to the cache area 120, and read data stored in the normal area 110 may be copied to the cache area 120. The cache area 120 may include a write cache area in which write data is stored and a read cache area in which read data is stored. Data stored in the cache area 120 may be provided to the storage device 20 according to a request from the storage device 20.

The host 10 may provide logical addresses and commands to the storage device 20. During a write operation, the host 10 may request the storage device 20 to program write data in a storage area of a non-volatile memory 220 corresponding to the logical address. During a read operation, the host 10 may request the storage device 20 for data read from the storage area of the non-volatile memory 220 corresponding to the logical address.

A write operation or a read operation for one logical address may be performed a plurality of times. Herein, a write operation or a read operation previously performed for one logical address may be referred to as a first write operation or a first read operation, and a write operation or a read operation performed later on the same logical address may be referred to as a second write operation or a second read operation. The second read operation may also be referred to as a cache read operation.

According to an embodiment of the disclosure, during the first write operation, the host 10 and the storage device 20 may complete a write operation without transmitting/receiving write data therebetween. For example, the host 10 may provide a logical address and a write command to the storage device 20 without providing write data to the storage device 20. The storage device 20 may request the host 10 to copy write data from the normal area 110 to the cache area 120. The storage device 20 may provide the host 10 with address information about the normal area 110 in which write data is stored and address information about the cache area 120 to which the write data is to be copied. Herein, address information may also be referred to as offset information. Offset information may be referred to as data buffer offset information. Offset information about the normal area 110 may be referred to as normal offset information, and offset information about the cache area 120 may be referred to as cache offset information. The storage device 20 may manage a mapping relationship between logical addresses and offset information (e.g., the L2C map of FIG. 10). The host 10 may copy write data in the normal area 110 to the cache area 120 based on the normal offset information and the cache offset information. The storage device 20 may provide the host with a response to the write command from the host 10. The storage device 20 may request transmission of write data from the host 10 during an idle time when data transmission between the host 10 and the storage device 20 is low. The idle time may be determined at least one of a data rate between the host device 10 and the storage device 10, a reference clock signal of the host device 10, an amount of data traffic in a predetermined time unit between the host device 10 and the storage device 20, and a predetermined time after the storage device 20 transmits the response to the write command to the host device 10, not being limited thereto. A flush operation in which write data stored in the cache area 120 is stored in the non-volatile memory 220 may be performed according to a request from the storage device 20. According to an embodiment, as the host 10 receives the response from the storage device 20 without transmitting write data to the storage device 20, the write operation may be completed quickly.

During the first read operation, the host 10 may provide a logical address and a read command to the storage device 20. The storage device 20 may read data stored in the non-volatile memory 220 in response to the read command, and may provide the read data to the host 10. The storage device 20 may provide the host 10 with normal offset information about a normal area 110 in which read data is to be stored and cache offset information about a cache area 120 in which read data is to be stored. The storage device 20 may manage a mapping relationship between logical addresses, normal offset information, and cache offset information. The host 10 may store read data provided from the storage device 20 in the normal area 110 and the cache area 120 based on the normal offset information and the cache offset information, respectively.

The second write operation may be a write-after-write operation performed on the same logical address after the first write operation, or may be a write-after-read operation performed on the same logical address after the first read operation. During the second write operation, the cache area 120 may be in a state storing read data or write data. The storage device 20 may determine a cache hit or a cache miss based on the logical address. When the logical address received from the host 10 is included as valid data in the L2C map, it may be determined to be a cache hit, and when a logical address received from the host 10 is not included as valid data in the L2C map, it may be determined to be a cache miss.

During the second write operation, the host 10 may provide a logical address and a write command to the storage device 20 without providing write data. The storage device 20 may provide the host 10 with new normal offset information about the normal area 110 in which the new write data is stored and new cache offset information about the cache area 120 in which the new write data is to be copied. The storage device 20 may update the new normal offset information and the new cache offset information mapped to logical addresses. The host 10 may copy new write data from the normal area 110 to the cache area 120 based on the new normal offset information and the new cache offset information. The storage device 20 may provide the host 10 with a response to the write command from the host 10. The storage device 20 may request transmission of the new write data from the host 10 during an idle time when data transmission between the host 10 and the storage device 20 is low. A flush operation in which data stored in the cache area 120 is stored in the non-volatile memory 220 may be performed according to a request of the storage device 20. According to an embodiment, as the host 10 receives the response from the storage device 20 without transmitting write data, the write operation may be completed quickly.

The second read operation may be a read-after-write operation performed after the first write operation or a read-after-read operation performed after the first read operation. During the second read operation, the cache area 120 may be in a state storing read data or write data. A second read operation may be performed in case of a cache hit, and a first read operation may be performed in case of a cache miss.

During the second read operation, the host 10 may provide a read command and a logical address to the storage device 20. The storage device 20 may omit an operation of reading data from the non-volatile memory 220, and provide cache offset information corresponding to the logical address to the host 10 based on the mapping relationship. The host 10 may copy data stored in the cache area 120 to the normal area 110 based on the cache offset information received from the storage device 20. That is, the host 10 may obtain read data by copying the data already stored in the cache area 120 to the normal area 110 without directly receiving the data from the storage device 20. During the second read operation, as the data is copied inside the host memory 100 without the data being transmitted/received between the host 10 and the storage device 20, the second read operation may be completed quickly. The capacity of the cache area 120 in the host 10 may be greater than that of an internal cache in the storage device 20. Accordingly, because a large amount of data may be stored in the cache area 120, a cache hit probability may increase, and an amount of data transmission between the host 10 and the storage device 20 may be reduced.

In some embodiments, during a first or second write operation, the host 10 may copy write data in the normal area 110 to the cache area 120 based on a data stream identifier. For example, the host 10 may allocate a stream identifier to write data, divide the cache area 120 into a plurality of regions based on the stream identifier, and store the write data in one or more regions among the plurality of regions according to the stream identifier. During an idle time, the storage device 20 may request transmission of data having the stream identifier, and the host 10 may transmit data in the one or more regions in the cache area 120 allocated to the stream identifier to the storage device 20. The stream identifier may be information different from a logical address or a physical address of a memory or offset information about the memory.

In some embodiments, during a first or second write operation, the host 10 may copy write data in the normal area 110 to the cache area 120 based on a program unit of data. A program unit may refer to the number of bits stored in one memory cell included in the non-volatile memory 220, such as a single-level cell (SLC) unit, a multi-level cell (MLC) unit, a triple-level cell (TLC) unit, a quad-level cell (QLC) unit, and the like. For example, when data is stored in QLC units in the non-volatile memory 220, since four (4) bits are stored in one memory cell, four times more data may be stored in the cache area 120 than when data is stored in SLC units. Accordingly, the host 10 may copy data of different sizes to the cache area 120 according to data program units.

The storage device 20 may include a memory controller 210 and a non-volatile memory 220. The memory controller 210 may overall control the storage device 20. Data read from the non-volatile memory 220 may be provided to the host 10, and data provided from the host 10 may be programmed into the non-volatile memory 220, according to control of the memory controller 210.

Figure 2:
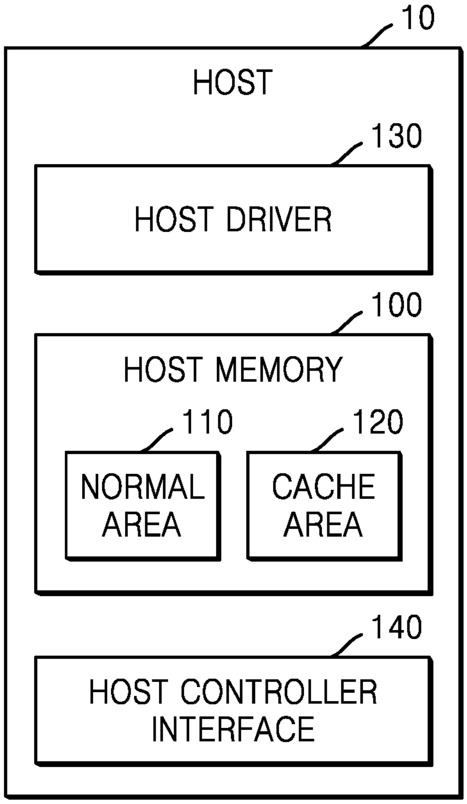
FIG. 2 is a block diagram illustrating a host according to an embodiment.

FIG. 2 is a block diagram illustrating a host 10 according to an embodiment. The host 10 shown in FIG. 2 may be the same as or correspond to the host 10 shown in FIG. 1.

Referring to FIG. 2, the host 10 may include a host driver 130, a host memory 100, and a host controller interface 140. According to an embodiment, the host 10 may be a UFS host complying with a UFS standard, but the disclosure is not limited thereto.

In some embodiments, the host driver 130 may convert an input/output request generated by an application into a UFS command defined by the UFS standard, and pass the UFS command to the host controller interface 140. One input-output request may be converted into multiple UFS commands. The input/output requests may also be referred to as task requests. A UFS command may be a concept including a UFS Protocol Information Unit (UPIU) according to the UFS standard. A UFS command may be basically a command defined by a small computer system interface (SCSI) standard, but may also be a command dedicated to the UFS standard.

The host controller interface 140 may transmit the UFS command converted by a UFS driver 2130 to the storage device 20. In FIG. 2, the host memory 100 is shown as a separate configuration from the host controller interface 140, but in some embodiments, the host memory 100 may be included in the host controller interface 140. The host controller interface 140 may copy data in the normal area 110 to the cache area 120 by controlling the host memory 100. The host controller interface 140 may transmit a logical address (e.g., a logical block address (LBA)) to the storage device 20.

Figure 3:
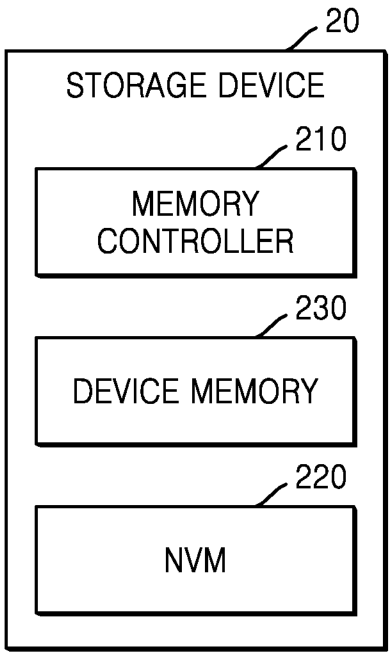
FIG. 3 is a block diagram illustrating a storage device according to an embodiment.

FIG. 3 is a block diagram illustrating a storage device 20 according to an embodiment. FIG. 3 is described with reference to FIG. 2. The storage device 20 shown in FIG. 3 may be the same as or correspond to the storage device 20 shown in FIG. 1.

Referring to FIG. 3, the storage device 20 may include a memory controller 210, a device memory 230, and a non-volatile memory 220. Descriptions of the memory controller 210 and the non-volatile memory 220 may be omitted since they have been given above with reference to FIG. 1.

The device memory 230 may temporarily store data to be programmed in the non-volatile memory 220 or data read from the non-volatile memory 220. The device memory 230 may include a static random access memory (SRAM) or dynamic random access memory (DRAM). The device memory 230 may store an L2C map which will be described later with reference to FIG. 10. The storage device 20 may update the L2C map during a write operation or a read operation. The L2C map may be referred to as an L2C table. In some embodiments, the capacity of the device memory 230 may be smaller than the capacity of the host memory 100. Accordingly, the storage device 20 may use the host memory 100 as a cache memory, according to an embodiment. The host 10 and the storage device 20 may provide improved write speed or read speed by performing a cache operation based on a cache having a sufficient capacity.

Figure 4:
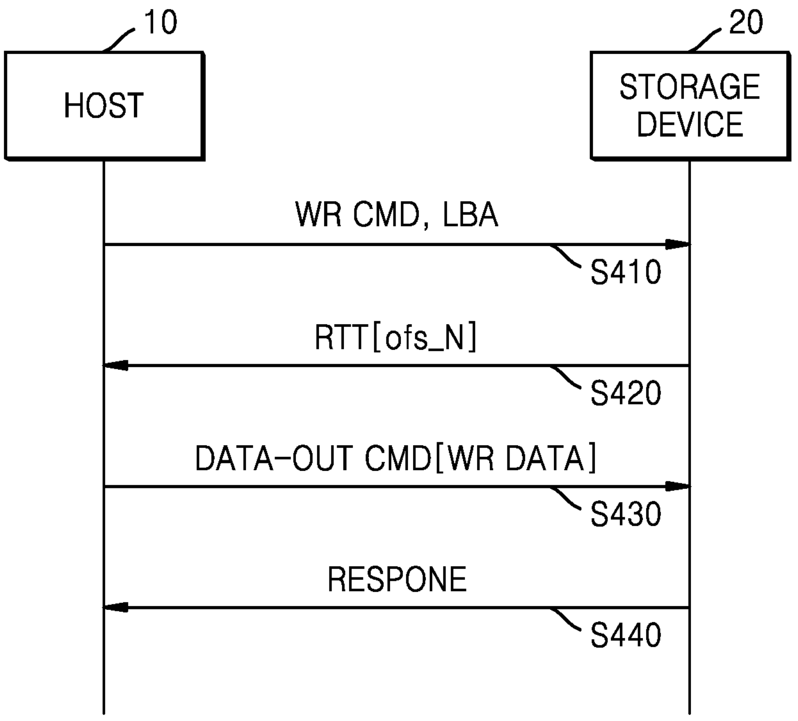
FIG. 4 is a diagram explaining a writing method of a storage system according to a comparative example.

FIG. 4 is a diagram explaining a writing method of a storage system according to a comparative example. FIG. 4 is described with reference to FIG. 1.

Referring to FIG. 4, the host 10 may provide a write command WR CMD and a logical address LBA to the storage device 20 in operation S410. When the host 10 is a UFS host and the storage device 20 is a UFS device, the write command WR CMD may be one of packets referred to as a UPIU. In some embodiments, the logical address LBA may be included in the write command WR CMD.

The storage device 20 may provide a ready-to-transfer (RTT) packet including offset information ofs_N about the normal area 110 of the host 10 to the host 10 in operation S420. The offset information ofs_N may indicate a location where write data is stored in the normal area 110. When the host 10 is a UFS host and the storage device 20 is a UFS device, the RTT packet may be a packet referred to as a UPIU.

The host 10 may provide a data-out command DATA-OUT CMD including write data WR DATA to the storage device 20 in operation S430. The host 10 may obtain write data WR DATA based on the offset information ofs_N.

The storage device 20 may provide the host 10 with a response indicating that the write operation for the write data WR DATA has been completed in operation S440.

According to the comparative example, since the write operation is completed after the write data is transmitted from the host 10 to the storage device 20, the write operation time may be delayed according to the size of the write data.

Figure 5:
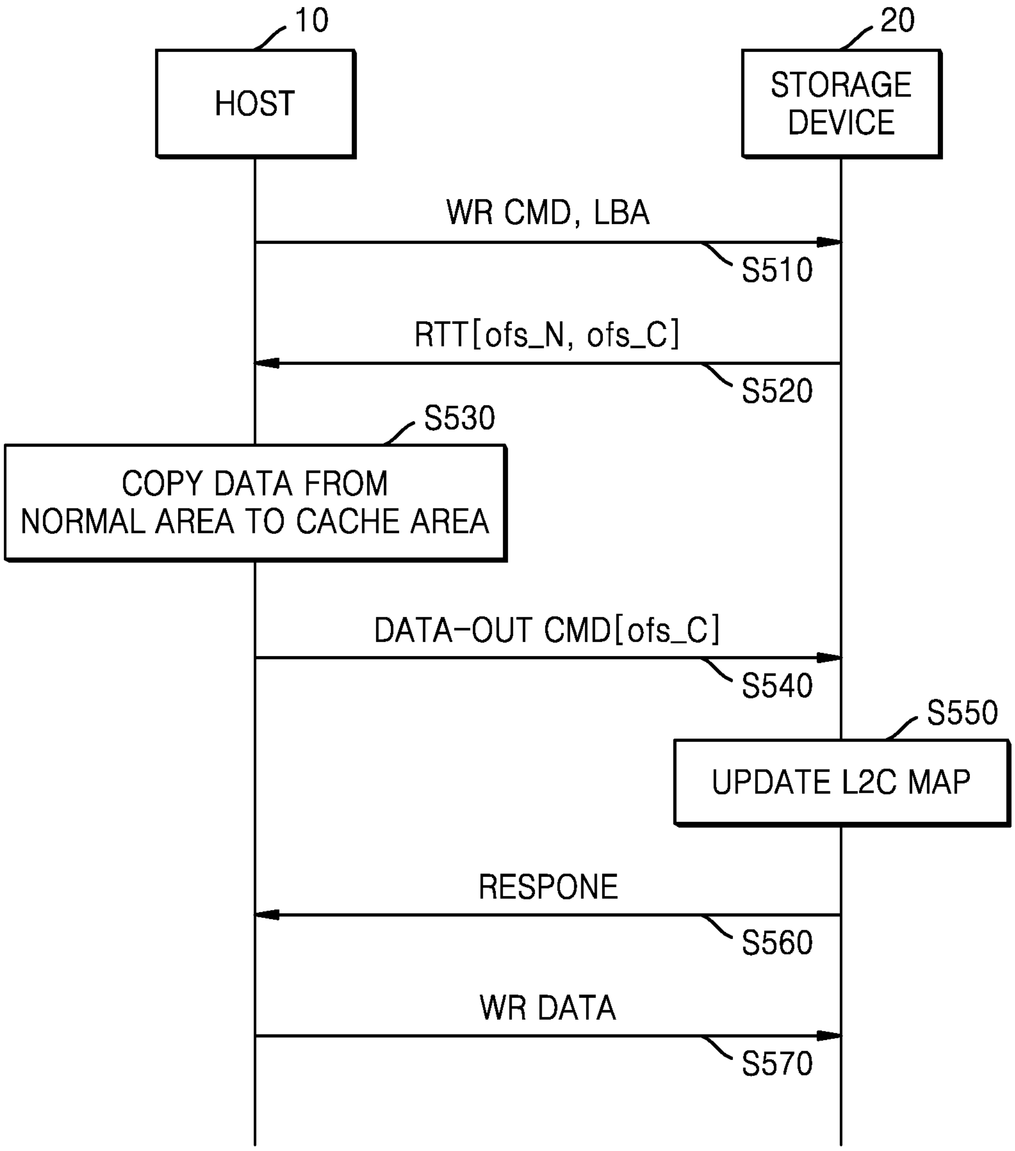
FIG. 5 is a diagram illustrating a writing method of a storage system according to an embodiment.

FIG. 5 is a diagram illustrating a writing method of a storage system according to an embodiment. FIG. 5 may explain the first write operation described above with reference to FIG. 1. FIG. 5 may be described with reference to FIG. 1.

Referring to FIG. 5, the host 10 may provide a write command WR CMD and a logical address LBA to the storage device 20 in operation S510. The host 10 and the storage device 20 may transmit/receive to/from each other data in the form of packets. In some embodiments, the logical address LBA may be included in the write command WR CMD. In some embodiments, when the host 10 is a UFS host and the storage device 20 is a UFS device, the host 10 and the storage device 20 may transmit/receive a packet referred to as a UPIU to/from each other. A description of the UPIU is provided later with reference to FIGS. 13A to 13F. A command UPIU corresponding to the write command WR CMD is described later in detail with reference to FIG. 13B.

The storage device 20 may provide the hots 10 with an RTT packet including normal offset information ofs_N and cache offset information ofs_C in operation S520. In some embodiments, the RTT packet may include normal transfer count information cnt_N indicating the length of data to be copied from the normal area 110 to the cache area 120, and/or cache transfer count information cnt_C indicating the length of data to be stored in the cache area 120. The RTT packet may be described later in detail with reference to FIG. 13E.

The host 10 may copy data in the normal area 110 to the cache area 120 based on the normal offset information and the cache offset information ofs_N and ofs_C in operation S530. For example, data in a region indicated by the normal offset information ofs_N may be stored in a region indicated by the cache offset information ofs_C.

The host 10 may provide a data-out command DATA-OUT CMD to the storage device 20 in operation S540. In some embodiments, the data-out command DATA-OUT CMD may be referred to as a data-out UPIU. The data-out command DATA-OUT CMD may include cache offset information ofs_C about the cache area 120 storing the copied data. The data-out command DATA-OUT CMD may not include write data. That is, the host 10 may provide the storage device 20 with only cache offset information ofs_C about the cache area 120 in which write data is stored. The host 10 may provide write data to the storage device 20 during an idle time or when the storage device 20 requests a flush operation.

The storage device 20 may update the L2C map in operation S550. The L2C map may indicate a mapping relationship between a logical address LBA and cache offset information ofs_C. In some embodiments, the L2C map may indicate a mapping relationship between a logical address LBA, cache offset information ofs_C, and normal offset information ofs_N.

In operation S540, the storage device 20 may confirm that write data is stored in a region indicated by the cache offset information ofs_C by receiving the cache offset information ofs_C. Accordingly, when a read command for the logical address LBA is received later from the host 10, instead of providing read data to the host 10, the storage device 20 may instruct the host 10 to read data from the cache area 120 by providing the cache offset information ofs_C to the host 10.

The storage device 20 may provide the host 10 with a response indicating that the write operation of the write data has been completed in operation S560.

The write command, RTT packet, data-out command or response of FIG. 5 may include a flag related to a function of storing the write data in the cache area 120.

The host 10 may provide the write data to the storage device 20 during an idle time or when requested by the storage device 20 in operation S570.

According to FIG. 5, since the storage device 20 provides a response to the host 10 before receiving write data, the write operation speed may be improved.

Figure 6:
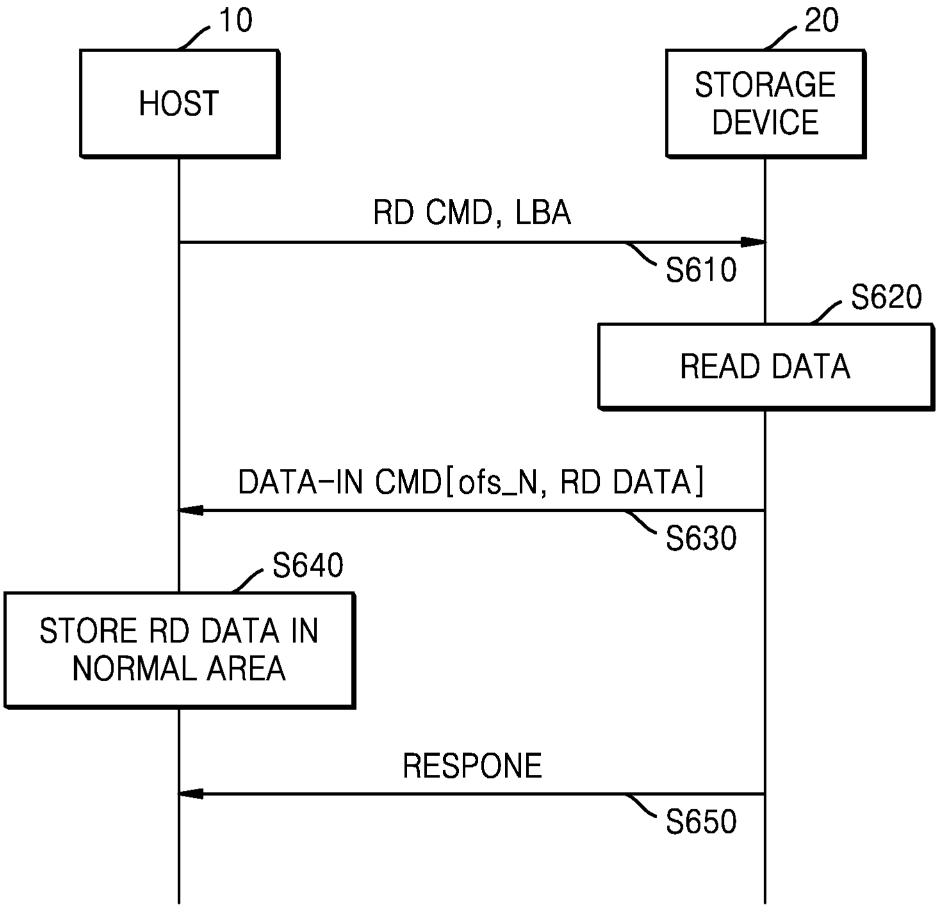
FIG. 6 is a diagram explaining a read method of a storage system according to a comparative example.

FIG. 6 is a diagram explaining a read method of a storage system according to a comparative example. FIG. 6 may be described with reference to FIG. 1.

The host 10 may provide a read command RD CMD and a logical address LBA to the storage device 20 in operation S610. In some embodiments, the logical address LBA may be included in the read command RD CMD. The read command RD CMD may be a command UPIU of FIG. 13B to be described later.

The storage device 20 may read data from an area of the non-volatile memory 220 corresponding to the logical address LBA in operation S620. The storage device 20 may convert the logical address LBA into a physical address PBA, and read data from the non-volatile memory 220 based on the physical address PBA.

The storage device 20 may provide the host 10 with a data-in command DATA-IN CMD including normal offset information ofs_N indicating a location in the normal area 110 where read data is to be stored in operation S630. data-in command DATA-IN may include read data RD DATA. The data-in command DATA-IN CMD may be a data-in UPIU of FIG. 13E.

The host 10 may store the read data RD DATA in the location in the normal area 110 indicated by the normal offset information ofs_N in operation S640.

In some embodiments, operations S620 to S640 may be performed for a predetermined data unit. Accordingly, in the case of a read operation for data exceeding a data unit, operations S620 to S640 may be repeatedly performed.

When all read data requested by the host 10 is transmitted to the host 10, the storage device 20 may provide a response indicating that the read operation has been completed to the host 10 in operation S650. The response may be the response UPIU of FIG. 13C.

Figure 7:
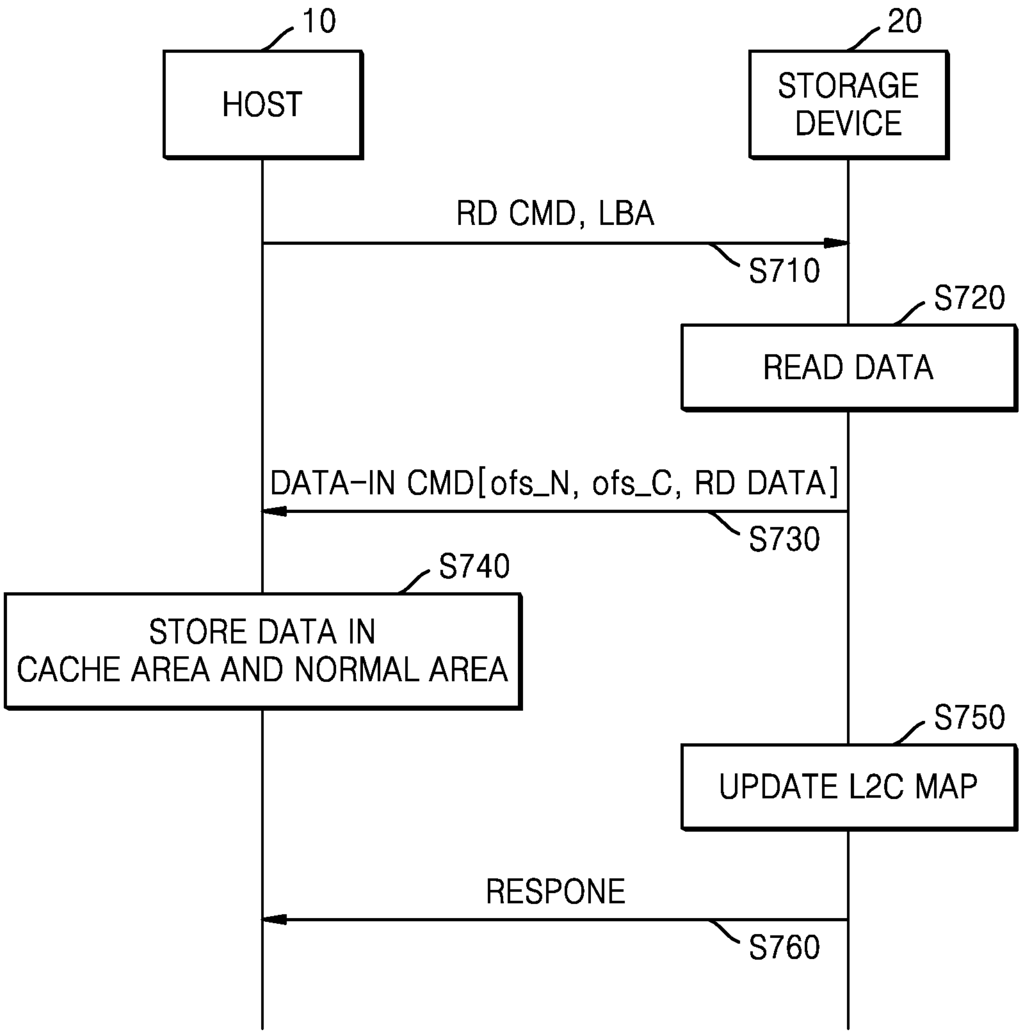
FIG. 7 is a diagram illustrating a read method of a storage system according to an embodiment.

FIG. 7 is a diagram illustrating a read method of a storage system according to an embodiment. FIG. 7 may be described with reference to FIG. 1. FIG. 7 may explain the first read operation described above with reference to FIG. 1.

The host 10 may provide a read command RD CMD and a logical address LBA to the storage device 20 in operation S710. The read command RD CMD may be a command UPIU of FIG. 13B to be described later. The read command RD CMD may include a flag related to a function for storing read data in the cache area 120.

The storage device 20 may read data from an area of the non-volatile memory 220 corresponding to the logical address LBA in operation S720. The storage device 20 may convert the logical address LBA into a physical address PBA and read data based on the physical address PBA.

The storage device 20 may provide the host 10 with read data RD DATA, normal offset information ofs_N indicating a location in the normal area 110 where the read data RD DATA is to be stored, and a data-in command DATA-IN CMD including cache offset information ofs_C indicating a location in the cache area 120 in operation S730. The data-in command DATA-IN CMD may be a data-in UPIU of FIG. 13E to be described later. For example, the storage device 20 may provide only the normal offset information ofs_N to the host 10 as shown in FIG. 6 based on the flag included in the read command CMD, or as shown in FIG. 7, provide normal offset information ofs_N and cache offset information ofs_C to the host 10. The data-in command DATA-IN CMD of FIG. 7 may include the flag related to a function of storing read data in the cache area 120.

The host 10 may store the read data RD DATA in the normal area 110 and the cache area 120 based on the normal offset information ofs_N and the cache offset information ofs_C in operation S740. In some embodiments, the read data RD DATA may be first stored in the normal area 110 and later stored in the cache area 120, and in some embodiments, the read data RD DATA may be first stored in the cache area 120 and stored later in the normal area 110.

The storage device 20 may update an L2C map representing a mapping relationship between logical addresses and cache offset information ofs_C in operation S750.

In some embodiments, operations S720 to S750 may be performed for a predetermined data unit. Accordingly, in the case of a read operation for data exceeding a data unit, S720 to S750 may be repeatedly performed.

When all data requested by the host 10 is transmitted to the host 10, the storage device 20 may provide a response indicating that the read operation has been completed to the host 10 in operation S760. The response may be the response UPIU of FIG. 13C.

Figure 8:
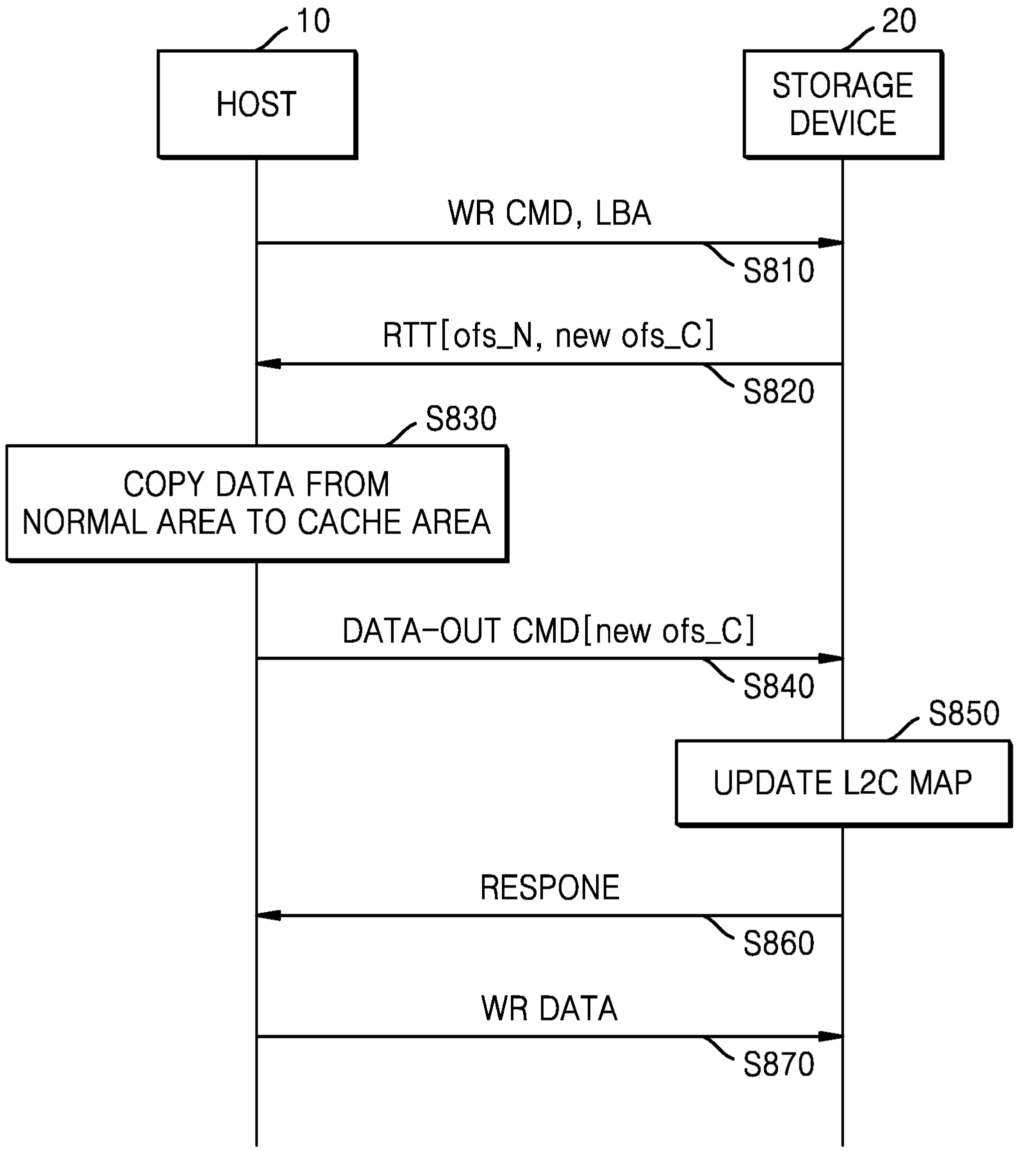
FIG. 8 is a diagram illustrating a writing method of a storage system according to an embodiment.

FIG. 8 is a diagram illustrating a write method of a storage system according to an embodiment. FIG. 8 may explain the second write operation described above with reference to FIG. 1. FIG. 8 may be described with reference to FIG. 1.

The host 10 may provide a write command WR CMD and a logical address LBA to the storage device 20 in operation S810. The logical address LBA may be a logical address of data stored in the cache area 120 according to the embodiment of FIG. 5 or FIG. 7.

The storage device 20 may provide an RTT packet including new cache offset information new ofs_C and normal offset information ofs_N to the host 10 in operation S820. For example, a write operation may be requested again for the logical address LBA for which a read or write operation has already been performed. In this case, the storage device 20 may include new cache offset information new ofs_C rather than the old cache offset information old ofs_C in the RTT packet. The normal offset information ofs_N may be old normal offset information old ofs_N or new normal offset information new ofs_N.

The host 10 may copy the data in the normal area 110 indicated by the normal offset information ofs_N to the cache area 120 indicated by the new cache offset information ofs_C in operation S830.

Operations S840 to S870 may be substantially the same as operations S530 to S570 of FIG. 5. The write command, RTT packet, data-out command or response of FIG. 8 may include a flag related to a function of storing write data in the cache area 120.

Figure 9:
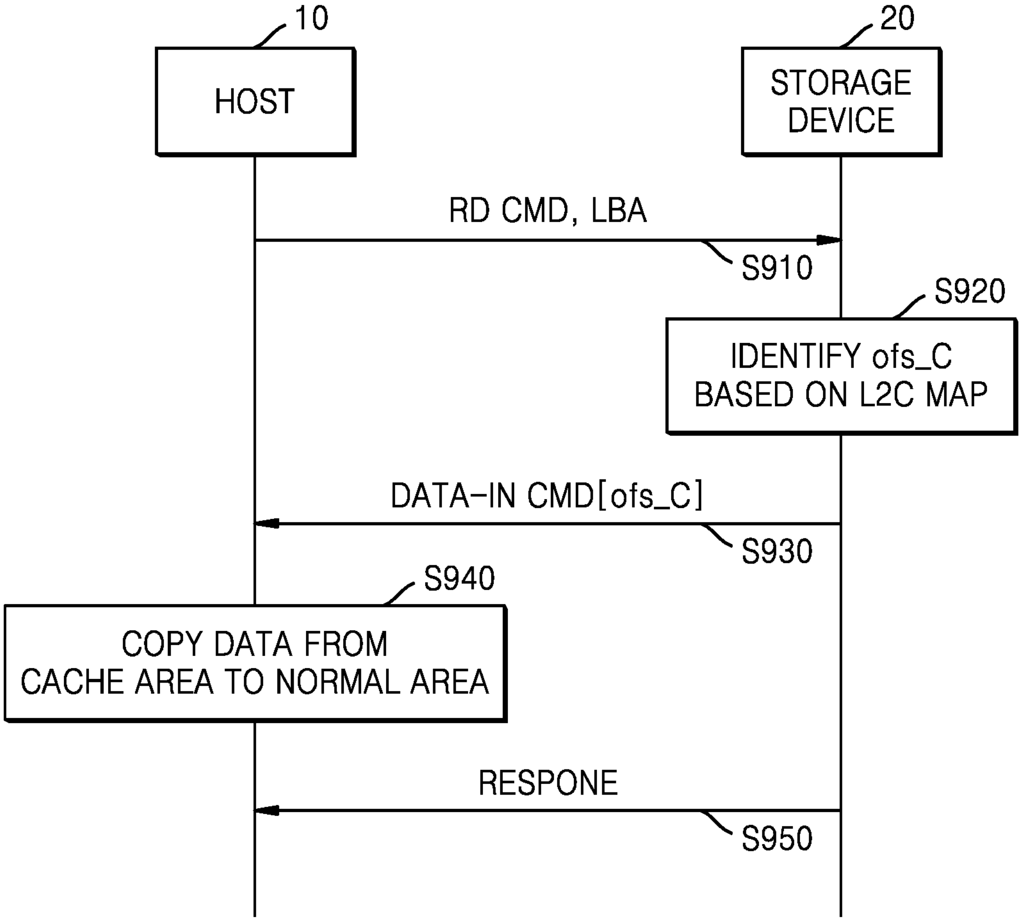
FIG. 9 is a diagram illustrating a read method of a storage system according to an embodiment.

FIG. 9 is a diagram illustrating a read method of a storage system according to an embodiment. FIG. 9 may explain the second read operation described above with reference to FIG. 1. FIG. 9 may be described with reference to FIG. 1.

The host 10 may provide a read command RD CMD and a logical address LBA to the storage device 20 in operation S910.

The storage device 20 may identify cache offset information ofs_C corresponding to the logical address LBA based on the L2C map in operation S920. That is, the cache offset information ofs_C mapped to the logical address LBA may be identified by searching the L2C map formed according to the embodiment of FIG. 5 or FIG. 7.

The storage device 20 may provide a data-in command DATA-IN CMD including the identified cache offset information ofs_C to the host 10 in operation S930. Unlike the data-in command of FIG. 6 or 7, the data-in command DATA-IN CMD may not include read data RD DATA. Accordingly, the storage device 20 may omit an operation of reading data from the non-volatile memory 220. In some embodiments, the data-in command DATA-IN CMD provides the host 10 with normal offset information ofs_N indicating the location of the normal area 110 to which the data in the cache area 120 will be copied.

The host 10 may copy data in the cache area 120 to the normal area 110 based on the cache offset information ofs_C. Accordingly, even if read data is not included in the data-in command DATA-IN CMD, the host 10 may obtain the read data requested from the storage device 20.

The storage device 20 may provide the host 10 with a response indicating that the read operation has been completed.

FIG. 10 is a diagram illustrating an L2C map according to an embodiment. FIG. 10 may be described with reference to FIG. 1.

Referring to FIG. 10, the L2C map may indicate a mapping relationship between a logical address LBA, normal offset information ofs_N, cache offset information ofs_C, a program unit PGM unit, and a stream identifier STR ID.

For example, the logical address LBA1, normal offset information ofs_N1, and cache offset information ofs_C1 are mapped, as described above with reference to FIG. 5 or FIG. 7. Thus, data at a location indicated by the normal offset information ofs_N1 in the normal area 110 may be copied to a location indicated by the cache offset information ofs_C1 in the cache area 120.

Alternatively or additionally, as described above with reference to FIG. 9, the storage device 20 may provide cache offset information ofs_C1 corresponding to the logical address LBA1 to the host 10 based on the L2C map, and the host 10 may copy data at a location indicated by the cache offset information ofs_C1 to the normal area 110.

Referring to FIG. 10, the storage device 20 may manage program units of data stored in the cache area 120 using the L2C map. That is, as described above with reference to operation S570 in FIG. 5 or operation S880 in FIG. 8, when requesting data transmission from the host 10, the storage device 20 may request data of different sizes from the host 10 according to program units.

Figure 11:
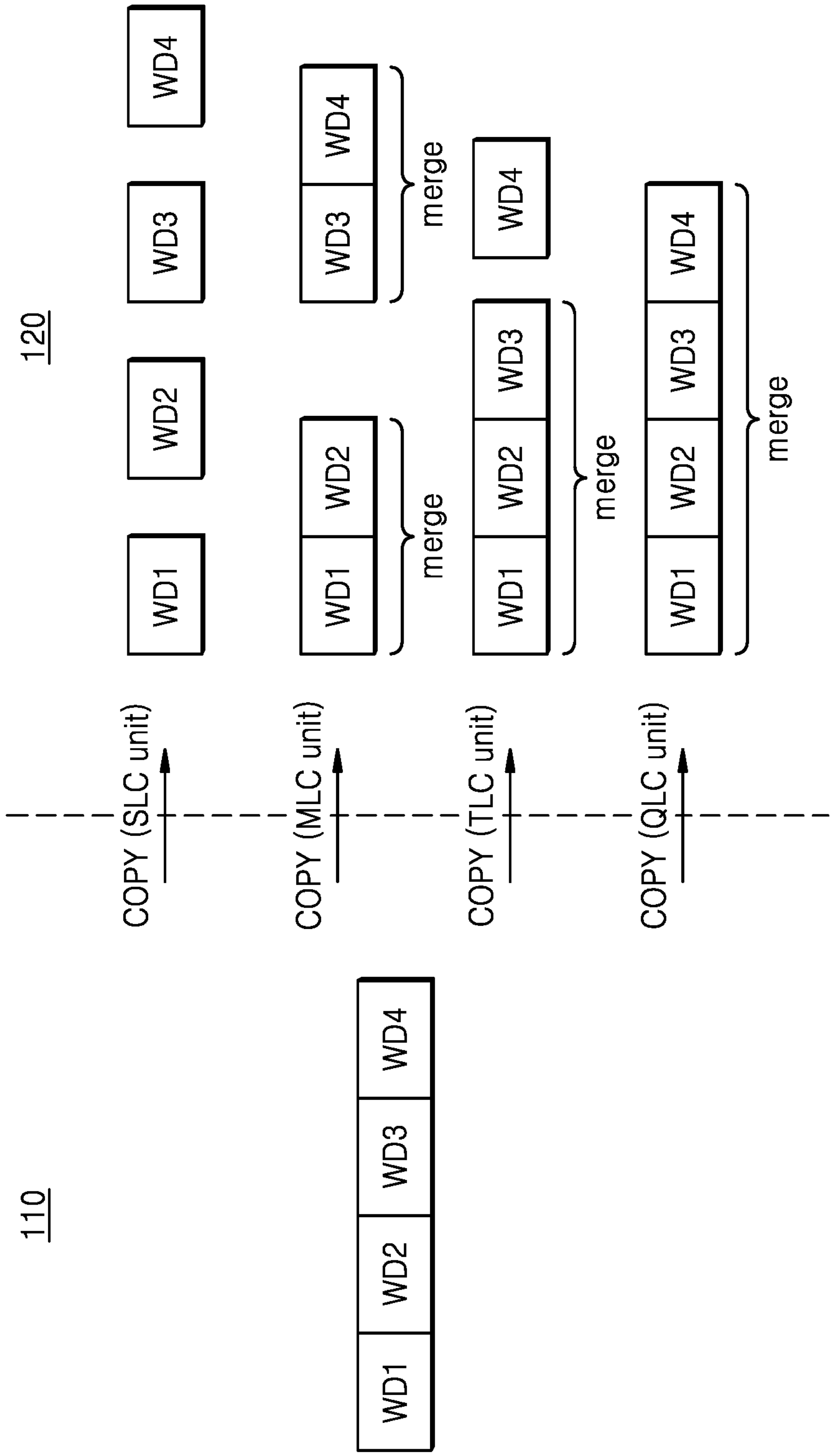
FIG. 11 is a diagram for explaining a method of storing data in a cache area based on program units according to an embodiment.

FIG. 11 is a diagram for explaining a method of storing data in a cache area based on program units according to an embodiment. FIG. 11 may be described with reference to FIG. 1.

Referring to FIG. 11, the host 10 may copy write data WD1, WD2, WD3, and WD4 of the normal area 110 to the cache area 120 based on a program unit. For example, each of the write data WD1, WD2, WD3, and WD4 may be data stored in a physical page of the non-volatile memory 220. One physical page may refer to memory cells connected to one word line.

When data is stored in the storage device 20 in SLC units, each of the write data WD1, WD2, WD3, and WD4 may be stored in a different page, for example. In this case, the write data WD1, WD2, WD3, and WD4 may be stored in the cache area 120 without being merged. Then, when there is a request from the storage device 20, each of the write data WD1, WD2, WD3, and WD4 may be individually provided to the storage device 20.

When data is stored in the storage device 20 in MLC units, write data WD1 and WD2 may be stored in a first page, and write data WD1 and WD2 may be stored in a second page, for example. In this case, the write data WD1 and WD2 may be merged and stored in the cache area 120, and the write data WD3 and WD4 may be merged and stored in the cache area 120. Then, when there is a request from the storage device 20, the write data WD1 and WD2 may be continuously provided to the storage device 20 and write data WD3 and WD4 may be continuously provided to the storage device 20. For example, the write data WD1 and WD2 may be provided to the storage device at the same time, at a substantially same time, in a concatenated form, and/or in a merged form.

When data is stored in the storage device 20 in units of TLC, write data WD1, WD2, and WD3 may be stored in a first page, and write data WD4 may be stored in a second page together with other write data, for example. In this case, the write data WD1, WD2, and WD3 may be merged and stored in the cache area 120, and the write data WD4 may be individually stored in the cache area 120. Thereafter, if there is a request from the storage device 20, the write data WD1, WD2, and WD3 may be continuously provided to the storage device 20. Write data WD4 may be continuously provided to the storage device 20 with two additional logical pages. A logical page may refer to data stored in a physical page. That is, a plurality of logical pages may be stored in one physical page according to a program unit.

When data is stored in the storage device 20 in QLC units, write data WD1, WD2, WD3, and WD4 may be stored in a same page. Accordingly, the write data WD1, WD2, WD3, and WD4 may be merged and stored in the cache area 120. Then, when there is a request from the storage device 20, the write data WD1, WD2, WD3, and WD4 may be continuously provided to the storage device 20.

Figure 12:
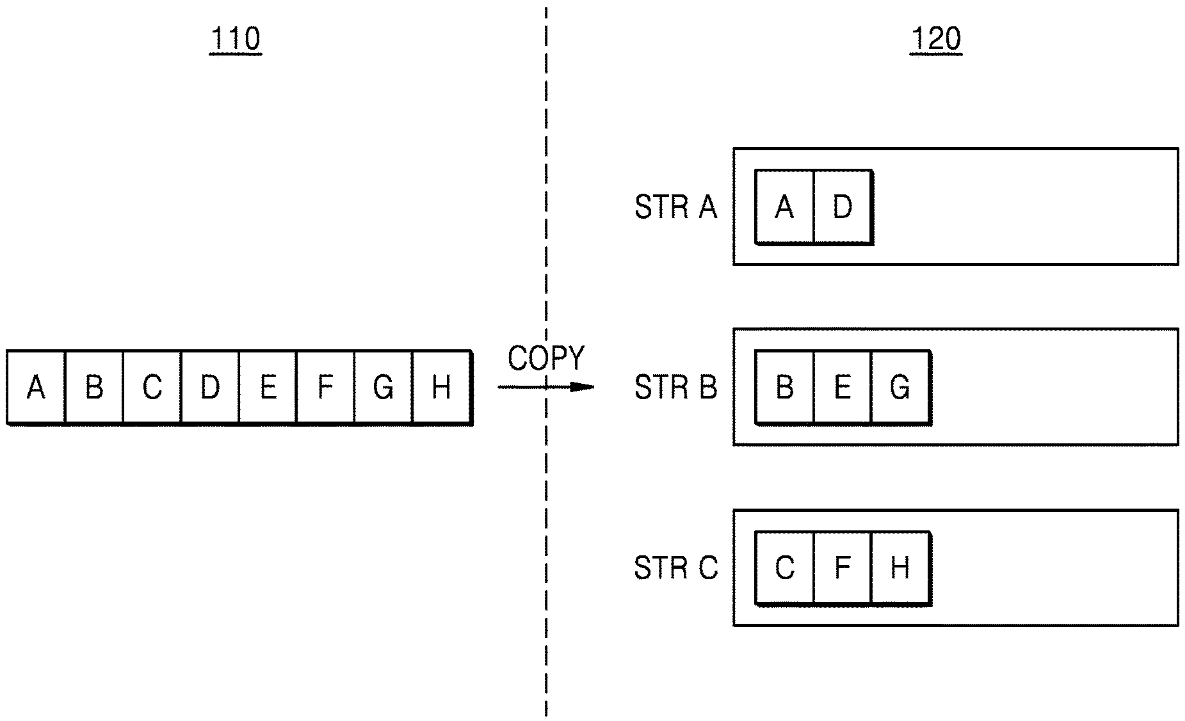
FIG. 12 is a diagram for explaining a method of storing data in a cache area based on a stream identifier according to an embodiment.

FIG. 12 is a diagram for explaining a method of storing data in a cache area based on a stream identifier according to an embodiment. FIG. 12 may be described with reference to FIG. 1.

Referring to FIG. 12, the host 10 copies write data A, B, C, D, E, F, G, and H of the normal area 110 to the cache area 120 based on the stream identifier.

For example, the host 10 may allocate an identifier A to the write data A and D, merge the write data A and D, and store the merged write data A and D in the cache area 120. Thereafter, if there is a request from the storage device 20, the write data A and D may be continuously provided to the storage device 20. For example, the write data A and D may be provided to the storage device, at the same time or at a substantially same time, in the merged form.

The host 10 may allocate an identifier B to the write data B, E and G, merge the write data B, E, and F, and store the merged write data B, E and G in the cache area 120. Thereafter, if there is a request from the storage device 20, the write data B, E and F may be continuously provided to the storage device 20. For example, the write data B, E and F may be provided to the storage device, at the same time or at a substantially same time, in the merged form.

The host 10 may allocate an identifier C to the write data C, F, and H, merge the write data C, F, and H, and store the merged write data C, F, and H in the cache area 120. Thereafter, if there is a request from the storage device 20, the write data C, F and H may be continuously provided to the storage device 20. For example, the write data C, F and H may be provided to the storage device, at the same time or at a substantially same time, in the merged form FIG. 13A is a diagram illustrating a data structure of a general UPIU according to an embodiment.

Referring to FIG. 13A, a general UPIU may have a structure including a Transaction Type field, a Flags field, a Logical Unit Number (LUN) field, a Task Tag field, an Initiator ID field, a Command Set Type field, a Query Function and Task Management Function field, a Response field, a Status field, a Total Extra Header Segment (EHS) Length field, a Device Information field, a Data Segment Length field (referred to as header), a Transaction Specific Fields field, an Extra Header Segment field, a Header End-to-End Cyclic Redundancy Check (E2ECRC) field, a Data Segment field, and a Data E2ECRC field. The length of the header may be 12 bytes, but is not limited thereto. The length of the UPIU may be a minimum of 32 bytes and a maximum of 65600 bytes, but is not limited thereto.

The Transaction Type field may indicate the type of request or response included in the data structure. For example, the Transaction Type field may include a transaction code, and the transaction code may define contents, functions, or use of the UPIU. The Flags field may have different values according to transaction types. According to an embodiment, the flag field may have a value indicating a cache operation.

The LUN field may include a LUN within a target device to which a request is sent. The target device may be, for example, the storage device 20 of FIG. 1, and a storage area in the storage device 20 may match at least one LUN.

The Task Tag field may be a value corresponding to a task request, and may be a value that increases whenever a new task request is generated. When a plurality of UPIUs are generated for one task request, all UPIUs may have the same Task Tag field value. For example, the Task Tag field may consist of eight (8) bits.

The Command Set Type field may indicate a command set type associated with a command UPIU and a response UPIU. The command UPIU may be a UPIU provided by the host 10 to the storage device 20, and the response UPIU may be a UPIU provided by the storage device 20 to the host 10.

The Query Function and Task Management Function field may be fields used in a query request UPIU and a query response UPIU to define query functions, and may be fields used in a task management request UPIU to define task management functions.

When a response is requested from the storage device 20, the Response field may indicate success or failure of the requested function.

The Status field may include a small computer system interface (SCSI) status when the UPIU is a response UPIU.

The Total EHS Length field may indicate the length of an additional header segment in the UPIU. The length of the additional header segment may be a multiple of four (4) bytes.

The Device Information field may provide information about the storage device 20, for example, device level information, within the response UPIU.

The Data Segment Length field may indicate the number of valid bytes of a data segment in the UPIU.

The Transaction Specific Fields field may be an additional field required by a certain transaction code.

The Extra Header Segment field may be present when the Total EHS Length field has a value other than 0, and may have a length corresponding to a multiple of four (4) bytes.

The Data Segment field may have a length corresponding to a multiple of four (4) bytes, and may include a data payload.

The header E2ECRC field may include CRC data for correcting errors in the header, and the data E2ECRC field may include CRC data for correcting errors in the data segment.

FIG. 13B is a diagram illustrating a data structure of a command UPIU according to an embodiment. FIG. 13B may be described with reference to FIGS. 1 and 13A.

The command UPIU may be a packet provided by the host 10 to the storage device 20. Referring to FIGS. 13A and 13B, a transaction code of the command UPIU in a field corresponding to the Transaction Type field of the general UPIU (shown in FIG. 13A) may be xx00 0001b, for example.

A flag field of the command UPIU corresponding to the Flags field of the general UPIU may have a value indicating a cache read operation or cache write operation described above.

The command UPIU may include an additional task tag field EXT_Task Tag. The additional task tag field EXT_Task Tag may include a value for identifying one task request. According to embodiments, the number of operations that may be performed by the host 10 and the storage device 20 may be increased by a write operation or a read operation using the cache offset information ofs_C. Accordingly, since it may be difficult to identify all task requests between the host 10 and the storage device 20 using only the Task Tag field of FIG. 13A, various task requests may be identified through the additional task tag field EXT_Task Tag.

The command UPIU may include an expected data transfer length field. The expected data transfer length field may indicate the length of write data to be transmitted. For example, the expected data transfer length field of the write command WR CMD of FIG. 4 may indicate the length of the write data WR DATA.

The command UPIU may include a Command Descriptor Blocks (CDB) field. The CDB field may include an operation code (opcode) of a command. The command UPIU may correspond to a write command UPIU or a read command UPIU according to an opcode. The CDB field may include a logical address.

FIG. 13C is a diagram illustrating a data structure of a response UPIU according to an embodiment. FIG. 13C may be described with reference to FIGS. 1 and 13A.

The response UPIU may be a packet provided by the storage device 20 to the host 10. Referring to FIGS. 13A and 13C, a transaction code of the response UPIU in a field corresponding to the Transaction Type field of the general UPIU (shown in FIG. 13A) may be xx10 0001b, for example.

A flag field of the response UPIU corresponding to the Flags field of the general UPIU may have a value indicating a cache read operation or cache write operation described above.

Like the command UPIU of FIG. 13B, the response UPIU may include an additional task tag field EXT_Task Tag. The additional task tag field EXT_Task Tag may replace the Query Function and Task Management Function fields of the general UPIU of FIG. 13A. In some embodiments, the additional task tag field EXT_Task Tag may replace the Status field of FIG. 13A or 13C.

The response UPIU may include a residual transfer count field. The residual transfer count field may indicate the number of unit sizes not transferred to the host 10.

The response UPIU may include a sense data field and a sense data length field. The sense data field may be a field indicating whether a previously executed command has an error. The sense data field may be 0 if a previously executed command was successfully executed. The sense data length field may be a field indicating the length of effective sense data.

FIG. 13D is a diagram illustrating a data structure of a data-out UPIU according to an embodiment. FIG. 13D may be described with reference to FIGS. 1, 5, 8 and 13A.

The data-out UPIU may be a packet provided by the host 10 to the storage device 20. Referring to FIGS. 13A and 13D, a transaction code of the data-out UPIU may be xx00 0010b in a field corresponding to the Transaction Type field of the general UPIU (shown in FIG. 13A), for example.

A flag field of the data-out UPIU corresponding to the Flags field of the general UPIU may have a value indicating the cache read operation or cache write operation described above.

The data-out UPIU may include an additional task tag field EXT_Task Tag like the command UPIU and response UPIU of FIGS. 13B and 13C.

The data-out UPIU may include offset information about the cache area 120, for example, cache offset information ofs_C, and the number of data transmissions copied to the cache area 120, which may be cache count information cnt_C. A unit of data transmission may be four (4) KB, and the size of data copied to the cache area 120 may be determined according to the cache count information cnt_C. For example, when the cache count information cnt_C indicates one (1), 4 KB data may be copied to the cache area 120.

The data-out UPIU may correspond to the data-out command DATA-OUT CMD described above for operation S540 of FIG. 5 and operation S840 of FIG. 8. Although the data-out command DATA-OUT CMD of FIGS. 5 and 8 includes only cache offset information, the embodiment is not limited thereto, and the data-out UPIU may further include cache count information cnt_C.

FIG. 13E is a diagram explaining a data structure of a data-in UPIU according to an embodiment. FIG. 13E may be described with reference to FIGS. 1, 7, 9, and 13A.

The data-in UPIU may be a packet provided by the storage device 20 to the host 10. Referring to FIGS. 13A and 13E, a transaction code of the data-in UPIU may be xx10 0010b in a field corresponding to the Transaction Type field of the general UPIU (shown in FIG. 13A), for example.

A flag field of the data-in UPIU corresponding to the Flags field of the general UPIU may have a value indicating the aforementioned cache read operation or cache write operation.

The data-in UPIU may include an additional task tag field EXT_Task Tag like the command UPIU and response UPIU of FIGS. 13B and 13C and the data-out UPIU of FIG. 13D.

The data-in UPIU may include offset information about the cache area 120, for example, cache offset information ofs_C, and the number of data transmissions copied from the cache area 120, which may be cache count information cnt_C. For example, upon a cache hit, the host 10 may copy the size according to the cache count information cnt_C from the cache area 120 indicated by the cache offset information ofs_C to the normal area 110.

In some embodiments, the data-in UPIU may include offset information about the normal area 110, for example, normal offset information ofs_N and the number of data transmissions copied from the normal area 110, which may be normal count information cnt_N. In some embodiments, upon a cache miss, the host 10 may store read data RD DATA in a region indicated by the normal offset information ofs_N. Also, the host 10 may copy data having the size of the normal count information cnt_N from the normal area 110 to the cache area 120.

Although the data-in UPIU of FIG. 13E does not include a data field, in a cache miss situation, the data-in UPIU may include a data field during a read operation. Additionally or alternatively, the data-in UPIU may include read data RD DATA. The data-in UPIU may correspond to the data-in command DATA-IN CMD described above for operation S730 of FIG. 7 and operation S930 of FIG. 9.

FIG. 13F is a diagram illustrating a data structure of an RTT UPIU according to an embodiment. FIG. 13F may be described with reference to FIGS. 1, 5, 8 and 13A.

The RTT UPIU may be a packet provided by the storage device 20 to the host 10. Referring to FIGS. 13A and 13F, a transaction code of the RTT UPIU may be xx00 0001 b in a field corresponding to the Transaction Type field of the general UPIU (shown in FIG. 13A), but is not limited thereto.

A flag field of the RTT UPIU may have a value indicating the aforementioned cache read operation or cache write operation.

The RTT UPIU may include an additional task tag field EXT_Task Tag like the command UPIU and response UPIU of FIGS. 13B and 13C, the data-out UPIU of FIG. 13D, and the data in UPIU of FIG. 13E.

The RTT UPIU may include a normal offset information field including normal offset information ofs_N about the normal area 110 and a cache offset information field including cache offset information ofs_C of the cache area 120.

The RTT UPIU may include normal transfer count information cnt_N indicating the length of data copied from the normal area 110 in case of a cache miss, and cache transfer count information cnt_N indicating the length of data cached from the cache area 120 in case of a cache hit. The RTT UPIU may correspond to the RTT packet described above for operation S520 of FIG. 5 and operation S820 of FIG. 8.

Figure 14:
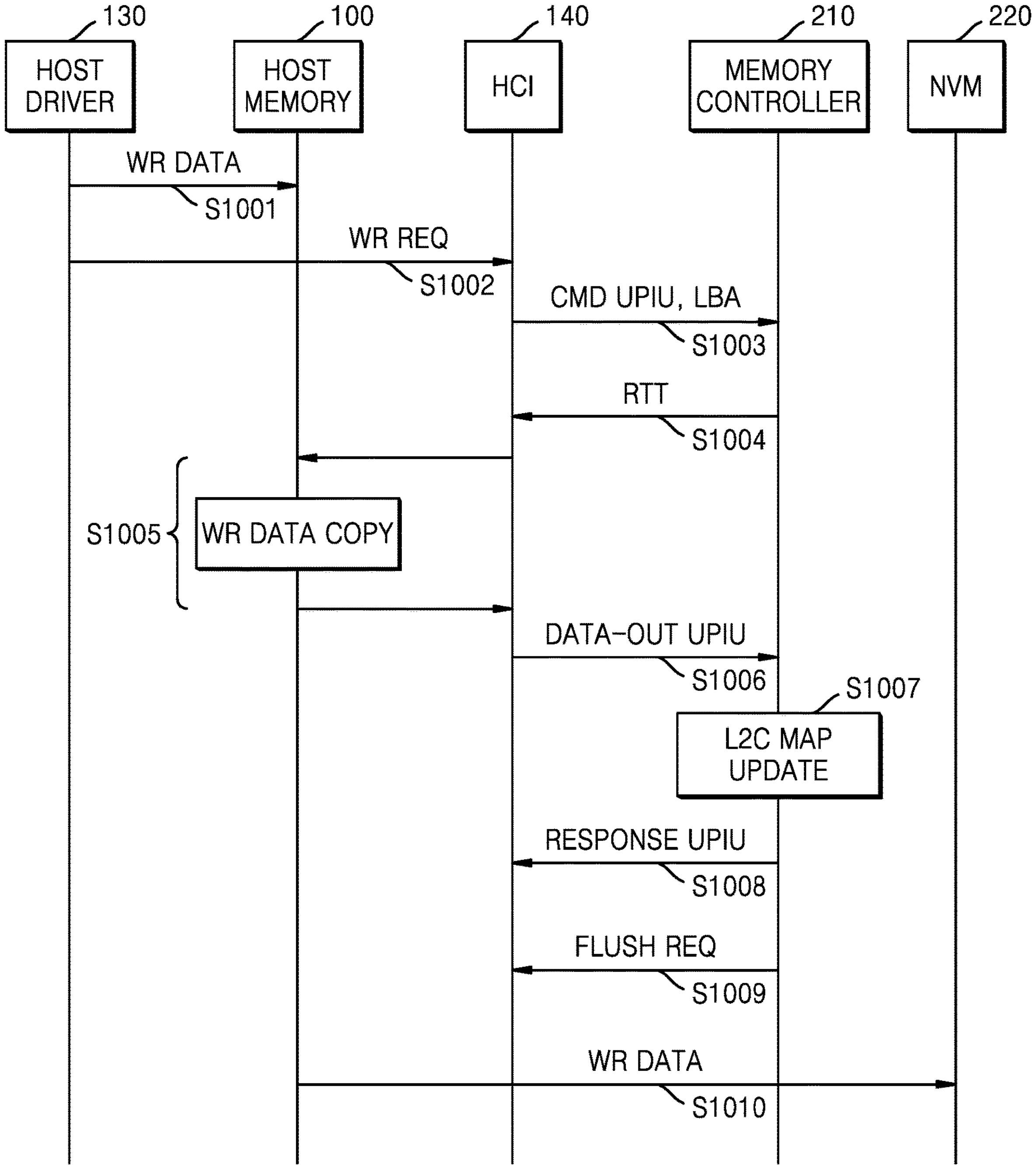
FIG. 14 is a diagram illustrating a write operation according to an embodiment.

FIG. 14 is a diagram illustrating a write operation according to an embodiment. FIG. 14 may be described with reference to FIG. 5.

The host driver 130 may store write data WR DATA in the normal area 110 of the host memory 100 in operation S1001. The host driver 130 may provide a write request WR REQ to the host controller interface 140 in operation 51002. The host controller interface 140 may provide a command UPIU and a logical address LBA to the memory controller 210 in operation S1003. Operation S1003 may be the same as operation S510. The memory controller may provide an RTT packet to the host controller interface 140 in operation 51004. Operation 51004 may be the same as operation S520.

The host controller interface 140 may copy the write data WR DATA in the normal area 110 to the cache area 120 in operation S1005. Operation S1005 may be the same as operation S530. The host controller interface 140 may provide the data-out UPIU to the memory controller 210 in operation S1006. Operation S1006 may be the same as operation S540. The memory controller 210 may update an L2C map in operation 51007. Operation 51007 may be the same as operation S550. The memory controller 210 may provide a response UPIU indicating that the write operation has been completed to the host controller interface 140 in operation 51008. Operation 51008 may be the same as operation S560. The memory controller 210 may provide a flush request to the host controller interface 140, and store the write data WR DATA stored in the cache area 120 in the non-volatile memory 220 in response to the flush request in operation S1010.

Figure 15:
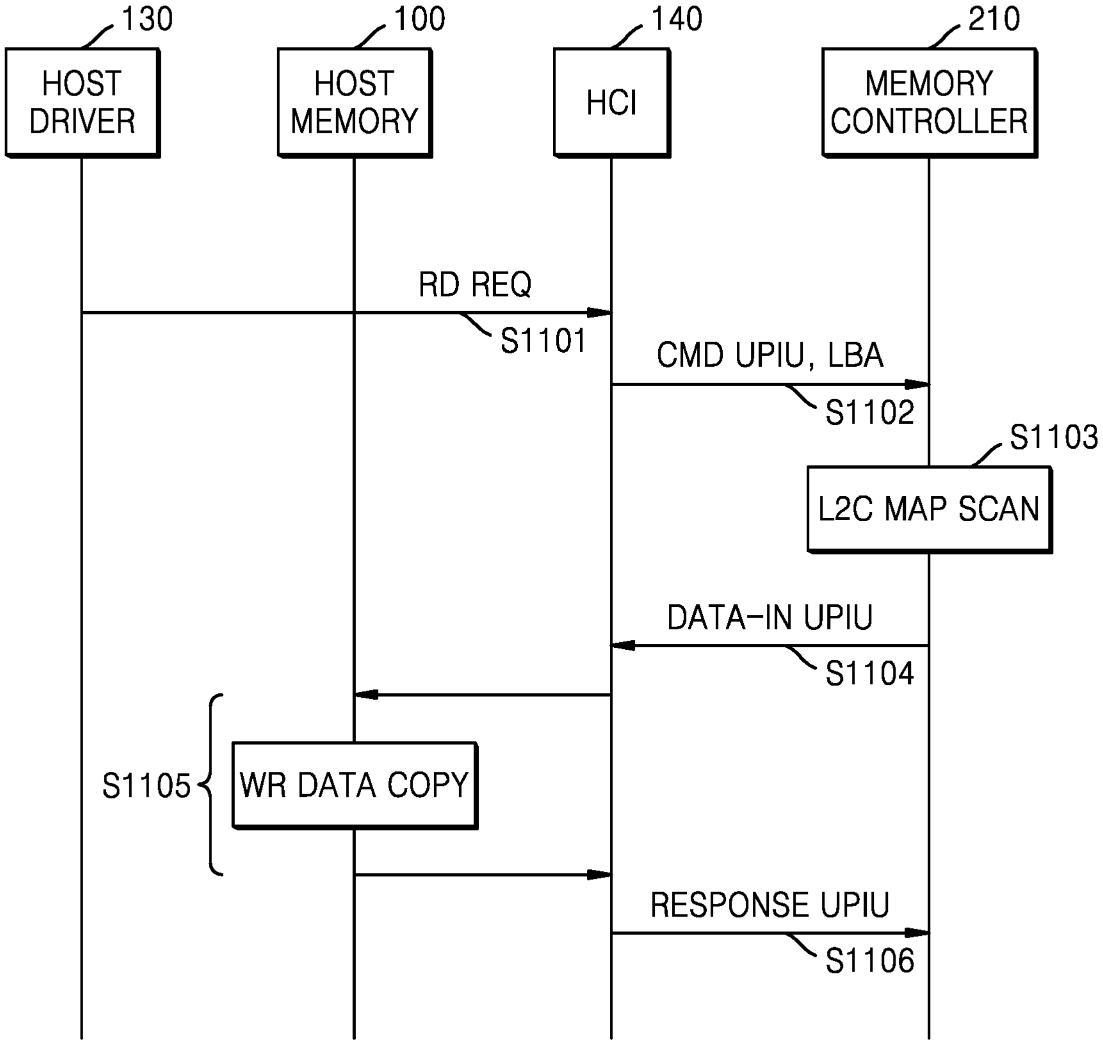
FIG. 15 is a diagram illustrating a read operation according to an embodiment.

FIG. 15 is a diagram illustrating a read operation according to an embodiment. FIG. 15 may be described with reference to FIG. 9.

The host driver 130 may provide a read request RD REQ to the host controller interface 140 in operation S1101. Operations S1102 to S1106 are implemented by the subject of execution by the host memory 100, the host controller interface 140, and the memory controller 210, and may be substantially the same as operations S920 to S950 of FIG. 9. Thus, duplicate descriptions are omitted herein.

Figure 16:
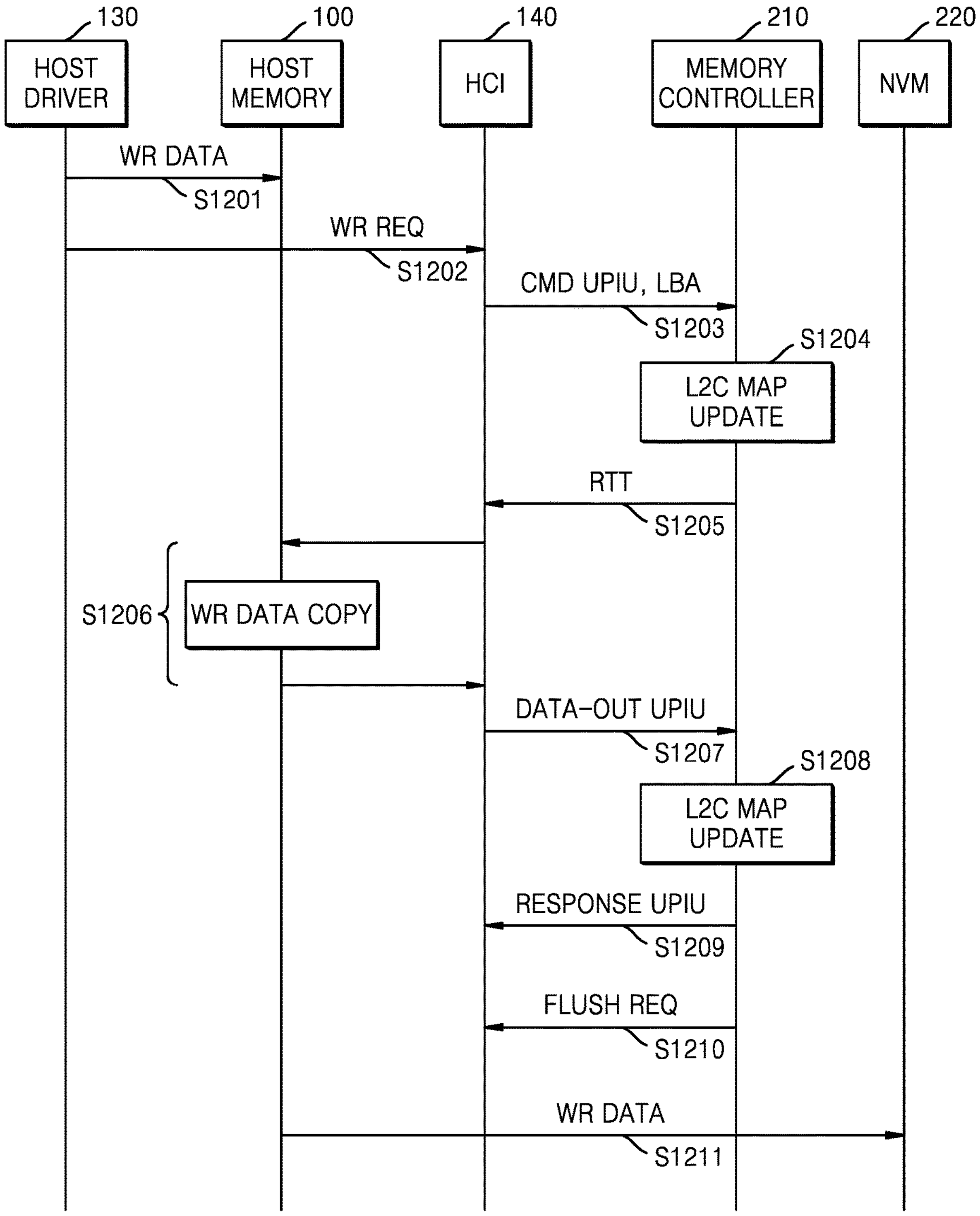
FIG. 16 is a diagram illustrating a write operation according to an embodiment.

FIG. 16 is a diagram illustrating a write operation according to an embodiment. FIG. 15 may be described with reference to FIG. 8.

The host driver 130 may store write data in the normal area 110 of the host memory 100 in operation 51201, and provide a write request WR REQ to the host controller interface 140 in operation S1202. Operations S1203 to S1109 are implemented by the subject of execution by the host memory 100, the host controller interface 140, and the memory controller 210 and may be substantially the same as operations S810 to S870 of FIG. 8. Thus, duplicate descriptions are omitted herein.

Meanwhile, the memory controller 210 may provide a flush request FLUSH REQ to the host controller interface 140 in operation S1210, and in response to the flush request FLUSH REQ, write data stored in the cache area 120 may be stored in the non-volatile memory 220 in operation 51211.

Figure 17:
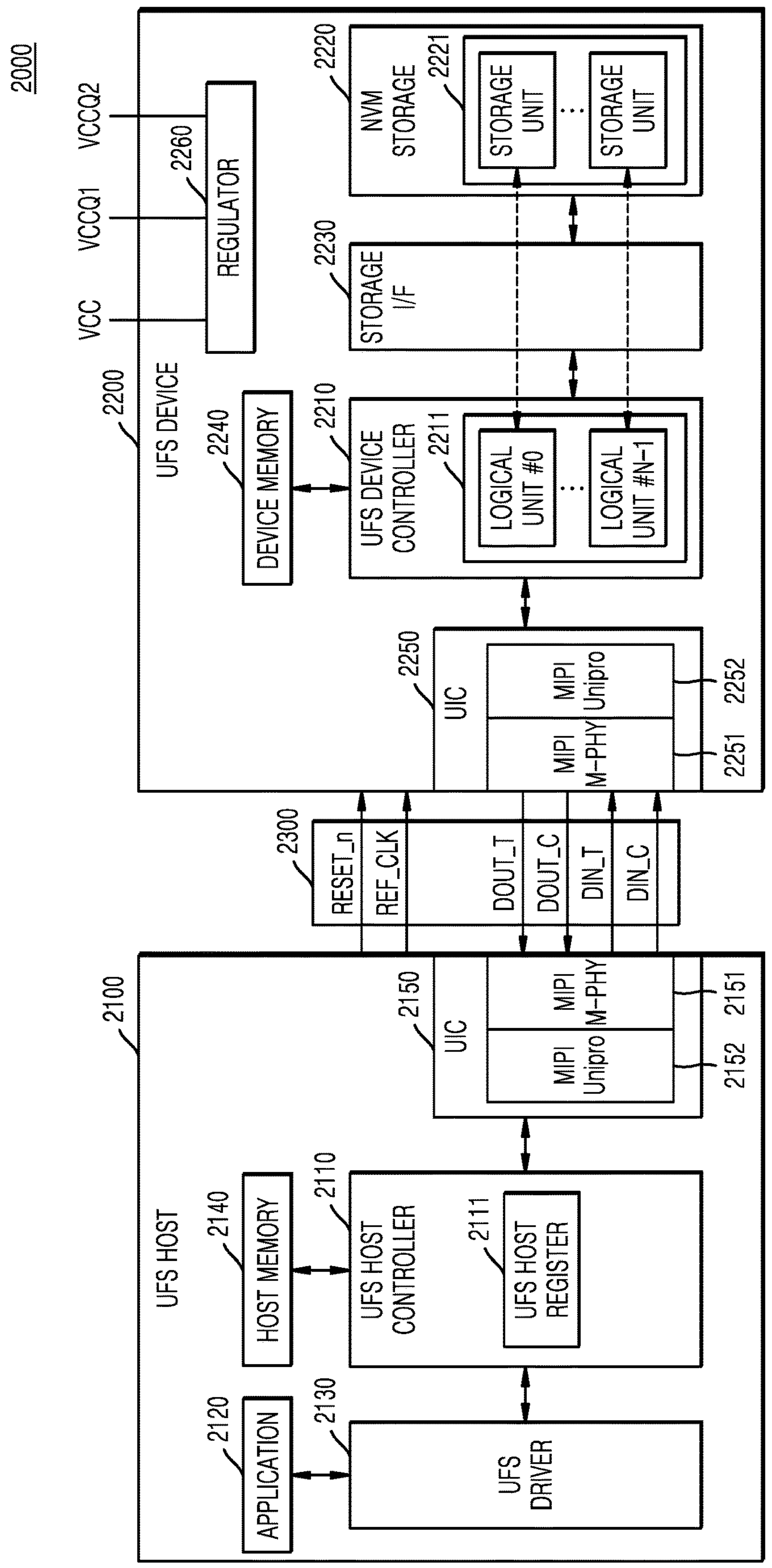
FIG. 17 is a diagram for explaining a UFS system according to an embodiment of the disclosure.

FIG. 17 is a diagram of a UFS system 2000 according to an embodiment. The UFS system 2000 may be a system conforming to a UFS standard announced by Joint Electron Device Engineering Council (JEDEC) and include a UFS host 2100, a UFS device 2200, and a UFS interface 2300. The above description of the storage system 1 of FIG. 1 may also be applied to the UFS system 2000 of FIG. 17 within a range that does not conflict with the following description of FIG. 17.

Referring to FIG. 17, the UFS host 2100 may be connected to the UFS device 2200 through the UFS interface 2300. The UFS host 200 may correspond to the host 10 of FIG. 1. The UFS device controller 2210 and NVM storage 2220 may correspond to the memory controller 210 and NVM 220 of FIG. 1, respectively.

The UFS host 2100 may include a UFS host controller 2110, an application 2120, a UFS driver 2130, a host memory 2140, and a UFS interconnect (UIC) layer 2150. The UFS device 2200 may include the UFS device controller 2210, the NVM 2220, a storage interface 2230, a device memory 2240, a UIC layer 2250, and a regulator 2260. The NVM 2220 may include a plurality of memory units 2221. Although each of the memory units 2221 may include a V-NAND flash memory having a 2D structure or a 3D structure, each of the memory units 2221 may include another kind of NVM, such as PRAM and/or RRAM. The UFS device controller 2210 may be connected to the NVM 2220 through the storage interface 2230. The storage interface 2230 may be configured to comply with a standard protocol, such as Toggle or ONFI.

The application 2120 may refer to a program that wants to communicate with the UFS device 2200 to use functions of the UFS device 2200. The application 2120 may transmit input-output requests (IORs) to the UFS driver 2130 for input/output (I/O) operations on the UFS device 2200. The IORs may refer to a data read request, a data storage (or write) request, and/or a data erase (or discard) request, without being limited thereto.

The UFS driver 2130 may manage the UFS host controller 2110 through a UFS-host controller interface (UFS-HCI). The UFS driver 2130 may convert the IOR generated by the application 2120 into a UFS command defined by the UFS standard, and transmit the UFS command to the UFS host controller 2110. One IOR may be converted into a plurality of UFS commands. Although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. During the transmission of the UFS command, a UFS host register 2111 of the UFS host controller 2110 may serve as a command queue (CQ).

The UIC layer 2150 on the side of the UFS host 2100 may include a mobile industry processor interface (MIPI) M-PHY 2151 and an MIPI UniPro 2152, and the UIC layer 2250 on the side of the UFS device 2200 may also include an MIPI M-PHY 2251 and an MIPI UniPro 2252.

The UFS interface 2300 may include a line configured to transmit a reference clock signal REF_CLK, a line configured to transmit a hardware reset signal RESET_n for the UFS device 2200, a pair of lines configured to transmit a pair of differential input signals DIN_t and DIN_c, and a pair of lines configured to transmit a pair of differential output signals DOUT_t and DOUT_c.

A frequency of a reference clock signal REF_CLK provided from the UFS host 2100 to the UFS device 2200 may be one of 19.2 MHz, 26 MHz, 38.4 MHz, and 52 MHz, without being limited thereto. The UFS host 2100 may change the frequency of the reference clock signal REF_CLK during an operation, for example, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 5, a pair of lines configured to transmit a pair of differential input signals DINT and DIN_C may constitute a receiving lane, and a pair of lines configured to transmit a pair of differential output signals DOUT_T and DOUT_C may constitute a transmission lane. Although one transmission lane and one receiving lane are illustrated in FIG. 17, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the NVM 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the NVM 2220 by using a logical unit (LU) 2211, which is a logical data storage unit. The number of LUs 2211 may be eight (8), without being limited thereto. The UFS device controller 2210 may include a flash translation layer (FTL), and convert a logical data address (e.g., an LBA) received from the UFS host 2100 into a physical data address (e.g., a physical block address (PBA)) by using address mapping information about the FTL. A logical block configured to store user data in the UFS system 2000 may have a size in a predetermined range. For example, a minimum size of the logical block may be set to 4 Kbyte.

When a command from the UFS host 2100 is applied through the UIC layer 2250 to the UFS device 2200, the UFS device controller 2210 may perform an operation in response to the command and transmit a completion response to the UFS host 2100 when the operation is completed.

As an example, when the UFS host 2100 intends to store user data in the UFS device 2200, the UFS host 2100 may transmit a data storage command to the UFS device 2200. When a response (a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the NVM 2220 based on the address mapping information about the FTL.

As another example, when the UFS host 2100 intends to read the user data stored in the UFS device 2200, the UFS host 2100 may transmit a data read command to the UFS device 2200. The UFS device controller 2210, which has received the command, may read the user data from the NVM 2220 based on the data read command and temporarily store the read user data in the device memory 2240. During the read operation, the UFS device controller 2210 may detect and correct an error in the read user data by using an error-correction code (ECC) engine embedded therein. The ECC engine may generate parity bits for write data to be written to the NVM 2220, and the generated parity bits may be stored in the NVM 2220 along with the write data. During the reading of data from the NVM 2220, the ECC engine may correct an error in read data by using the parity bits read from the NVM 2220 along with the read data, and output error-corrected read data.

In addition, the UFS device controller 2210 may transmit user data, which is temporarily stored in the device memory 2240, to the UFS host 2100. In addition, the UFS device controller 2210 may further include an advanced encryption standard (AES) engine. The AES engine may perform at least of an encryption operation and a decryption operation on data transmitted to the UFS device controller 2210 by using a symmetric-key algorithm.

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, for example, even before receiving a notification that the previously transmitted command has been processed by the UFS device 2200, the UFS host 2100 may transmit a next command, which is on standby in the CQ, to the UFS device 2200. Thus, the UFS device 2200 may also receive a next command from the UFS host 2100 during the processing of the previously transmitted command. A maximum number (or queue depth) of commands that may be stored in the CQ may be, for example, 32. Also, the CQ may be implemented as a circular queue in which a start and an end of a command line stored in a queue are indicated by a head pointer and a tail pointer.

Each of the plurality of memory units 2221 may include a memory cell array (not shown) and a control circuit (not shown) configured to control an operation of the memory cell array. The memory cell array may include a 2D memory cell array or a 3D memory cell array. The memory cell array may include a plurality of memory cells. Although each of the memory cells is an SLC configured to store 1-bit information, each of the memory cells may be a cell configured to store information about two (2) bits or more, such as an MLC, a TLC, and a quadruple-level cell (QLC). The 3D memory cell array may include a vertical NAND string in which at least one memory cell is vertically oriented and located on another memory cell.

Voltages VCC, VCCQ, and VCCQ2 may be applied as power supply voltages to the UFS device 2200. The voltage VCC may be a main power supply voltage for the UFS device 2200 and be in a range of 2.4 V to 3.6 V. The voltage VCCQ may be a power supply voltage for supplying a low voltage mainly to the UFS device controller 2210 and be in a range of 1.14 V to 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of 1.7 V to 1.95 V. The power supply voltages may be supplied through the regulator 2260 to respective components of the UFS device 2200. The regulator 2260 may be implemented as a set of unit regulators respectively connected to different ones of the power supply voltages described above.

Figure 18:
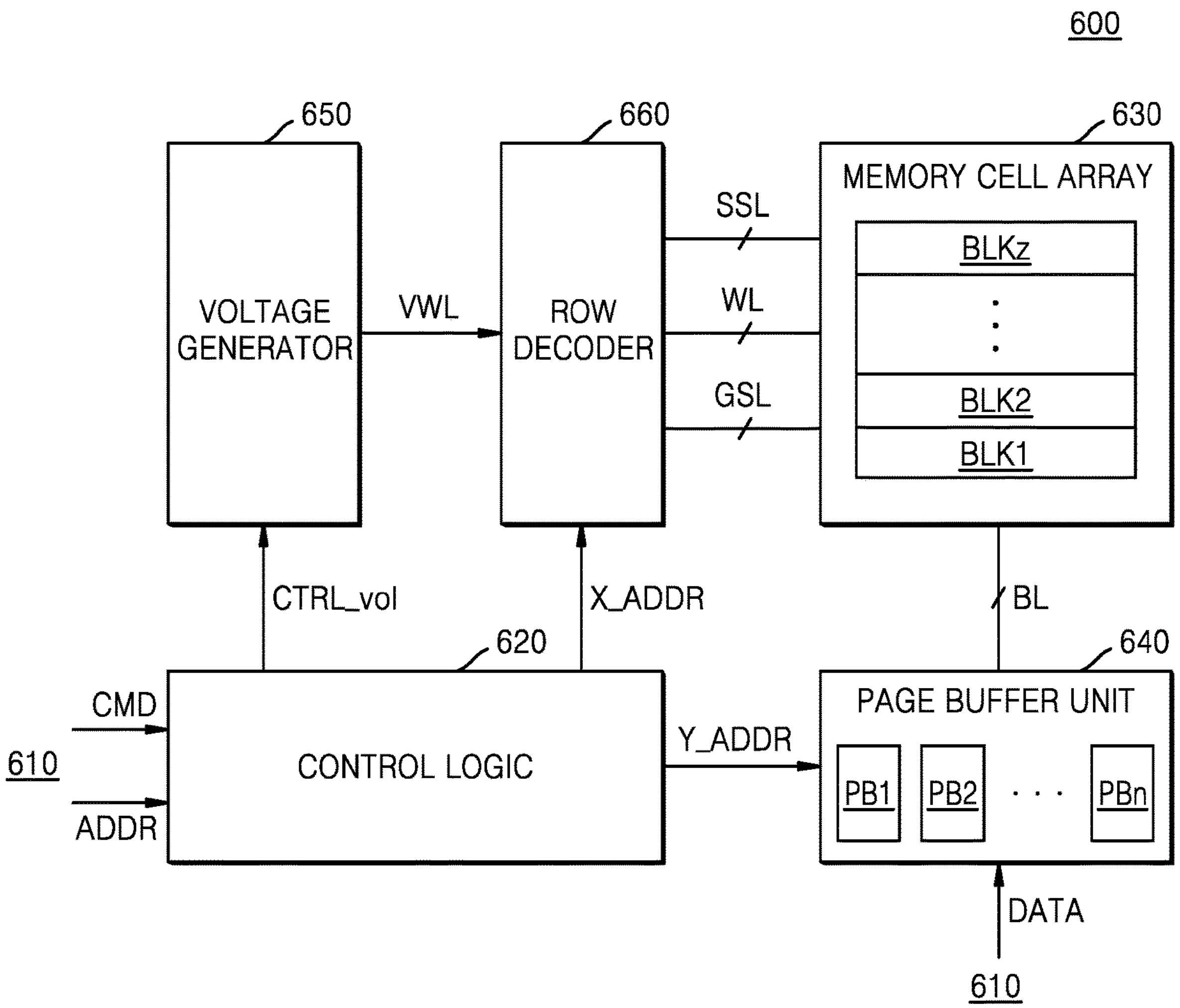
FIG. 18 is a block diagram illustrating the non-volatile memory of FIG. 1.

FIG. 18 is a block diagram illustrating the non-volatile memory of FIG. 1. The non-volatile memory 220 of FIG. 1 may be referred to as a memory device 600. Referring to FIG. 18, a memory device 600 may include a memory interface circuit 610, a control logic circuit 620, a memory cell array 630, a page buffer unit 640, a voltage generator 650, and a row decoder 660. Although not shown in FIG. 6, the memory device 600 may further include a column logic, a pre-decoder, a temperature sensor, a command decoder, an address decoder, and the like.

The control logic circuit 620 may overall control various operations within the memory device 600. The control logic circuit 620 may output various control signals in response to a command CMD and/or an address ADDR from the memory interface circuit 610. For example, the control logic circuit 620 may output a voltage control signal CTRL_vol, a row address X-ADDR, and a column address Y-ADDR.

The memory cell array 630 may include a plurality of memory blocks BLK1 to BLKz (z is a positive integer), and each of the plurality of memory blocks BLK1 to BLKz may include a plurality of memory cells. The memory cell array 630 may be connected to the page buffer unit 640 through bit lines BL, and may be connected to the row decoder 660 through word lines WL, string select lines SSL, and ground select lines GSL.

In an embodiment, the memory cell array 630 may include a 3D memory cell array, and the 3D memory cell array may include a plurality of NAND strings. Each NAND string may include memory cells respectively connected to word lines stacked vertically on the substrate. U.S. Pat. Nos. 7,679,133, 8,553,466, 8,654,587, 8,559,235, and US Patent Application Publication No. 2011/0233648 are incorporated herein by reference. In an embodiment, the memory cell array 630 may include a 3D memory cell array, and the 3D memory cell array may include a plurality of NAND strings.

The page buffer unit 640 may include a plurality of page buffers PB1 to PBn (n is an integer greater than or equal to 3), and the plurality of page buffers PB1 to PBn may be respectively connected to memory cells through a plurality of bit lines BL The page buffer unit 640 may select at least one bit line among the bit lines BL in response to the column address Y-ADDR. The page buffer unit 640 may operate as a write driver or a sense amplifier according to an operation mode. For example, during a program operation, the page buffer unit 640 may apply a bit line voltage corresponding to data to be programmed to a selected bit line. During a read operation, the page buffer unit 640 may sense data stored in the memory cell by sensing the current or voltage of the selected bit line.

The voltage generator 650 may generate various types of voltages for performing program, read, and erase operations based on the voltage control signal CTRL_vol. For example, the voltage generator 650 may generate a program voltage, a read voltage, a program verify voltage, an erase voltage, and the like as the word line voltage VWL.

The row decoder 660 may select one of the plurality of word lines WL in response to the row address X-ADDR, and may select one of the plurality of string select lines SSL. For example, the row decoder 660 may apply a program voltage and a program verify voltage to the selected word line during a program operation, and may apply a read voltage to the selected word line during a read operation.

Figure 19:
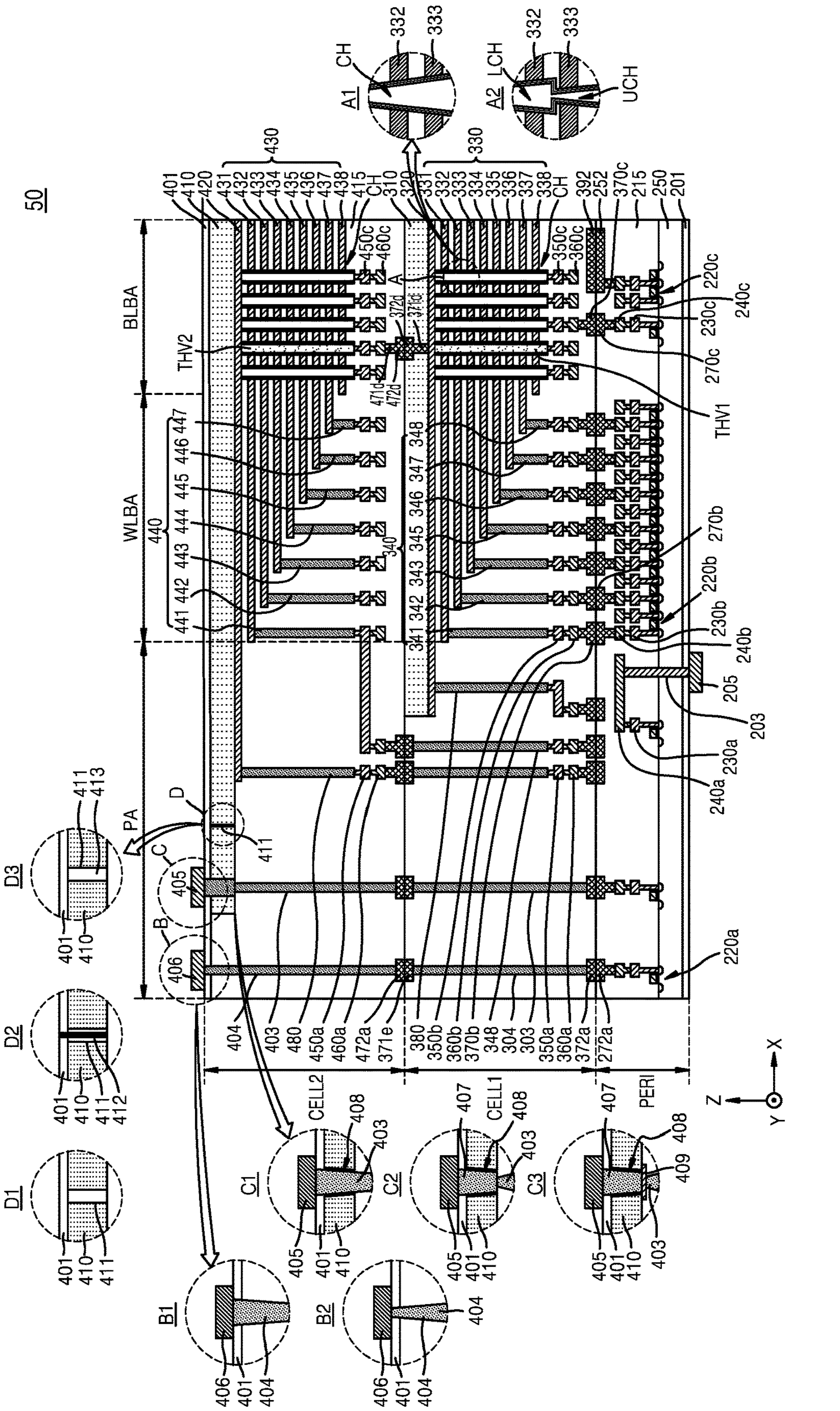
FIG. 19 is a cross-sectional view of a memory device having a B-VNAND structure, according to an embodiment.

FIG. 19 is a view illustrating a memory device 50 according to some embodiments of the disclosure.

Referring to FIG. 19, the memory device 50 may have a chip-to-chip (C2C) structure. At least one upper chip including a cell region and a lower chip including a peripheral circuit region PERI may be manufactured separately, and then, the at least one upper chip and the lower chip may be connected to each other by a bonding method to realize the C2C structure. For example, the bonding method may mean a method of electrically or physically connecting a bonding metal pattern formed in an uppermost metal layer of the upper chip to a bonding metal pattern formed in an uppermost metal layer of the lower chip. For example, in a case in which the bonding metal patterns are formed of copper (Cu), the bonding method may be a Cu—Cu bonding method. Alternatively, the bonding metal patterns may be formed of aluminum (Al) or tungsten (W).

The memory device 50 may include the at least one upper chip including the cell region. For example, as illustrated in FIG. 19, the memory device 50 may include two upper chips. However, the number of the upper chips is not limited thereto. In the case in which the memory device 50 includes the two upper chips, a first upper chip including a first cell region CELL1, a second upper chip including a second cell region CELL2 and the lower chip including the peripheral circuit region PERI may be manufactured separately, and then, the first upper chip, the second upper chip and the lower chip may be connected to each other by the bonding method to manufacture the memory device 50. The first upper chip may be turned over and then may be connected to the lower chip by the bonding method, and the second upper chip may also be turned over and then may be connected to the first upper chip by the bonding method. Hereinafter, upper and lower portions of each of the first and second upper chips will be defined based on before each of the first and second upper chips is turned over. In other words, an upper portion of the lower chip may mean an upper portion defined based on a +Z-axis direction, and the upper portion of each of the first and second upper chips may mean an upper portion defined based on a −Z-axis direction in FIG. 19. However, embodiments of the disclosure are not limited thereto. In certain embodiments, one of the first upper chip and the second upper chip may be turned over and then may be connected to a corresponding chip by the bonding method.

Each of the peripheral circuit region PERI and the first and second cell regions CELL1 and CELL2 of the memory device 50 may include an external pad bonding region PA, a word line bonding region WLBA, and a bit line bonding region BLBA. In some embodiments, the memory cell array 630 of FIG. 18 may be formed in the first and second cell regions CELL1 and CELL2 and the peripheral circuits excluding the memory cell array 630 may be formed in the peripheral circuit region PERI.

The peripheral circuit region PERI may include a first substrate 250 and a plurality of circuit elements 220*a*, 220*b* and 220*c* formed on the first substrate 250. An interlayer insulating layer 215 including one or more insulating layers may be provided on the plurality of circuit elements 220*a*, 220*b* and 220*c*, and a plurality of metal lines electrically connected to the plurality of circuit elements 220*a*, 220*b* and 220*c* may be provided in the interlayer insulating layer 215. For example, the plurality of metal lines may include first metal lines 230*a*, 230*b* and 230*c* connected to the plurality of circuit elements 220*a*, 220*b* and 220*c*, and second metal lines 240*a*, 240*b* and 240*c* formed on the first metal lines 230*a*, 230*b* and 230*c*. The plurality of metal lines may be formed of at least one of various conductive materials. For example, the first metal lines 230*a*, 230*b* and 230*c* may be formed of tungsten having a relatively high electrical resistivity, and the second metal lines 240*a*, 240*b* and 240*c* may be formed of copper having a relatively low electrical resistivity.

The first metal lines 230*a*, 230*b* and 230*c* and the second metal lines 240*a*, 240*b* and 240*c* are illustrated and described in the present embodiments. However, embodiments of the disclosure are not limited thereto. In certain embodiments, at least one or more additional metal lines may further be formed on the second metal lines 240*a*, 240*b* and 240*c*. In this case, the second metal lines 240*a*, 240*b* and 240*c* may be formed of aluminum, and at least some of the additional metal lines formed on the second metal lines 240*a*, 240*b* and 240*c* may be formed of copper having an electrical resistivity lower than that of aluminum of the second metal lines 240*a*, 240*b* and 240*c*.

The interlayer insulating layer 215 may be disposed on the first substrate 250, and may include an insulating material such as silicon oxide and/or silicon nitride.

Each of the first and second cell regions CELL1 and CELL2 may include at least one memory block. The first cell region CELL1 may include a second substrate 310 and a common source line 320. A plurality of word lines 330 (331 to 338) may be stacked on the second substrate 310 in a direction (i.e., the Z-axis direction) perpendicular to a top surface of the second substrate 310. String selection lines and a ground selection line may be disposed on and under the word lines 330, and the plurality of word lines 330 may be disposed between the string selection lines and the ground selection line. Likewise, the second cell region CELL2 may include a third substrate 410 and a common source line 420, and a plurality of word lines 430 (431 to 438) may be stacked on the third substrate 410 in a direction (i.e., the Z-axis direction) perpendicular to a top surface of the third substrate 410. Each of the second substrate 310 and the third substrate 410 may be formed of at least one of various materials and may be, for example, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CELL1 and CELL2.

In some embodiments, as illustrated in a region 'A1', the channel structure CH may be provided in the bit line bonding region BLBA, and may extend in the direction perpendicular to the top surface of the second substrate 310 to penetrate the word lines 330, the string selection lines, and the ground selection line. The channel structure CH may include a data storage layer, a channel layer, and a filling insulation layer. The channel layer may be electrically connected to a first metal line 350*c* and a second metal line 360*c* in the bit line bonding region BLBA. For example, the second metal line 360*c* may be a bit line, and may be connected to the channel structure CH through the first metal line 350*c*. The bit line 360*c* may extend in a first direction (e.g., a Y-axis direction) parallel to the top surface of the second substrate 310.

In some embodiments, as illustrated in a region 'A2', the channel structure CH may include a lower channel LCH and an upper channel UCH, which are connected to each other.

For example, the channel structure CH may be formed by a process of forming the lower channel LCH and a process of forming the upper channel UCH. The lower channel LCH may extend in the direction perpendicular to the top surface of the second substrate 310 to penetrate the common source line 320 and lower word lines 331 and 332. The lower channel LCH may include a data storage layer, a channel layer, and a filling insulation layer, and may be connected to the upper channel UCH. The upper channel UCH may penetrate upper word lines 333 to 338. The upper channel UCH may include a data storage layer, a channel layer, and a filling insulation layer, and the channel layer of the upper channel UCH may be electrically connected to the first metal line 350*c* and the second metal line 360*c*. As a length of a channel increases, due to characteristics of manufacturing processes, it may be difficult to form a channel having a substantially uniform width. The memory device 500 according to the present embodiments may include a channel having improved width uniformity due to the lower channel LCH and the upper channel UCH which are formed by the processes performed sequentially.

In the case in which the channel structure CH includes the lower channel LCH and the upper channel UCH as illustrated in the region ‘A2’, a word line located near to a boundary between the lower channel LCH and the upper channel UCH may be a dummy word line. For example, the word lines 332 and 333 adjacent to the boundary between the lower channel LCH and the upper channel UCH may be the dummy word lines. In this case, data may not be stored in memory cells connected to the dummy word line. Alternatively, the number of pages corresponding to the memory cells connected to the dummy word line may be less than the number of pages corresponding to the memory cells connected to a general word line. A level of a voltage applied to the dummy word line may be different from a level of a voltage applied to the general word line, and thus it is possible to reduce an influence of a non-uniform channel width between the lower and upper channels LCH and UCH on an operation of the memory device.

Meanwhile, the number of the lower word lines 331 and 332 penetrated by the lower channel LCH is less than the number of the upper word lines 333 to 338 penetrated by the upper channel UCH in the region ‘A2’. However, embodiments of the disclosure are not limited thereto. In certain embodiments, the number of the lower word lines penetrated by the lower channel LCH may be equal to or more than the number of the upper word lines penetrated by the upper channel UCH. In addition, structural features and connection relation of the channel structure CH disposed in the second cell region CELL2 may be substantially the same as those of the channel structure CH disposed in the first cell region CELL1.

In the bit line bonding region BLBA, a first through-electrode THV1 may be provided in the first cell region CELL1, and a second through-electrode THV2 may be provided in the second cell region CELL2. As illustrated in FIG. 19, the first through-electrode THV1 may penetrate the common source line 320 and the plurality of word lines 330. In certain embodiments, the first through-electrode THV1 may further penetrate the second substrate 310. The first through-electrode THV1 may include a conductive material. Alternatively, the first through-electrode THV1 may include a conductive material surrounded by an insulating material. The second through-electrode THV2 may have the same shape and structure as the first through-electrode THV1.

In some embodiments, the first through-electrode THV1 and the second through-electrode THV2 may be electrically connected to each other through a first through-metal pattern 372*d* and a second through-metal pattern 472*d*. The first through-metal pattern 372*d* may be formed at a bottom end of the first upper chip including the first cell region CELL1, and the second through-metal pattern 472*d* may be formed at a top end of the second upper chip including the second cell region CELL2. The first through-electrode THV1 may be electrically connected to the first metal line 350*c* and the second metal line 360*c*. A lower via 371*d* may be formed between the first through-electrode THV1 and the first through-metal pattern 372*d*, and an upper via 471*d* may be formed between the second through-electrode THV2 and the second through-metal pattern 472*d*. The first through-metal pattern 372*d* and the second through-metal pattern 472*d* may be connected to each other by the bonding method.

In addition, in the bit line bonding region BLBA, an upper metal pattern 252 may be formed in an uppermost metal layer of the peripheral circuit region PERI, and an upper metal pattern 392 having the same shape as the upper metal pattern 252 may be formed in an uppermost metal layer of the first cell region CELL1. The upper metal pattern 392 of the first cell region CELL1 and the upper metal pattern 252 of the peripheral circuit region PERI may be electrically connected to each other by the bonding method. In the bit line bonding region BLBA, the bit line 360*c* may be electrically connected to a page buffer included in the peripheral circuit region PERI. For example, some of the circuit elements 220*c* of the peripheral circuit region PERI may constitute the page buffer, and the bit line 360*c* may be electrically connected to the circuit elements 220*c* constituting the page buffer through an upper bonding metal pattern 370*c* of the first cell region CELL1 and an upper bonding metal pattern 270*c* of the peripheral circuit region PERI.

Referring continuously to FIG. 19, in the word line bonding region WLBA, the word lines 330 of the first cell region CELL1 may extend in a second direction (e.g., an X-axis direction) parallel to the top surface of the second substrate 310 and may be connected to a plurality of cell contact plugs 340 (341 to 347). First metal lines 350*b* and second metal lines 360*b* may be sequentially connected onto the cell contact plugs 340 connected to the word lines 330. In the word line bonding region WLBA, the cell contact plugs 340 may be connected to the peripheral circuit region PERI through upper bonding metal patterns 370*b* of the first cell region CELL1 and upper bonding metal patterns 270*b* of the peripheral circuit region PERI.

The cell contact plugs 340 may be electrically connected to a row decoder included in the peripheral circuit region PERI. For example, some of the circuit elements 220*b* of the peripheral circuit region PERI may constitute the row decoder, and the cell contact plugs 340 may be electrically connected to the circuit elements 220*b* constituting the row decoder through the upper bonding metal patterns 370*b* of the first cell region CELL1 and the upper bonding metal patterns 270*b* of the peripheral circuit region PERI. In some embodiments, an operating voltage of the circuit elements 220*b* constituting the row decoder may be different from an operating voltage of the circuit elements 220*c* constituting the page buffer. For example, the operating voltage of the circuit elements 220*c* constituting the page buffer may be greater than the operating voltage of the circuit elements 220*b* constituting the row decoder.

Likewise, in the word line bonding region WLBA, the word lines 430 of the second cell region CELL2 may extend in the second direction (e.g., the X-axis direction) parallel to the top surface of the third substrate 410 and may be connected to a plurality of cell contact plugs 440 (441 to 447). The cell contact plugs 440 may be connected to the peripheral circuit region PERI through an upper metal pattern of the second cell region CELL2 and lower and upper metal patterns and a cell contact plug 348 of the first cell region CELL1.

In the word line bonding region WLBA, the upper bonding metal patterns 370*b* may be formed in the first cell region CELL1, and the upper bonding metal patterns 270*b* may be formed in the peripheral circuit region PERI. The upper bonding metal patterns 370*b* of the first cell region CELL1 and the upper bonding metal patterns 270*b* of the peripheral circuit region PERI may be electrically connected to each other by the bonding method. The upper bonding metal patterns 370*b* and the upper bonding metal patterns 270*b* may be formed of aluminum, copper, or tungsten.

In the external pad bonding region PA, a lower metal pattern 371*e* may be formed in a lower portion of the first cell region CELL1, and an upper metal pattern 472*a* may be formed in an upper portion of the second cell region CELL2. The lower metal pattern 371*e* of the first cell region CELL1 and the upper metal pattern 472*a* of the second cell region CELL2 may be connected to each other by the bonding method in the external pad bonding region PA. Likewise, an upper metal pattern 372*a* may be formed in an upper portion of the first cell region CELL1, and an upper metal pattern 272*a* may be formed in an upper portion of the peripheral circuit region PERI. The upper metal pattern 372*a* of the first cell region CELL1 and the upper metal pattern 272*a* of the peripheral circuit region PERI may be connected to each other by the bonding method.

Common source line contact plugs 380 and 480 may be disposed in the external pad bonding region PA. The common source line contact plugs 380 and 480 may be formed of a conductive material such as a metal, a metal compound, and/or doped polysilicon. The common source line contact plug 380 of the first cell region CELL1 may be electrically connected to the common source line 320, and the common source line contact plug 480 of the second cell region CELL2 may be electrically connected to the common source line 420. A first metal line 350*a* and a second metal line 360*a* may be sequentially stacked on the common source line contact plug 380 of the first cell region CELL1, and a first metal line 450*a* and a second metal line 460*a* may be sequentially stacked on the common source line contact plug 480 of the second cell region CELL2.

Input/output pads 205, 405 and 406 may be disposed in the external pad bonding region PA. Referring to FIG. 19, a lower insulating layer 201 may cover a bottom surface of the first substrate 250, and a first input/output pad 205 may be formed on the lower insulating layer 201. The first input/output pad 205 may be connected to at least one of a plurality of the circuit elements 220*a* disposed in the peripheral circuit region PERI through a first input/output contact plug 203 and may be separated from the first substrate 250 by the lower insulating layer 201. In addition, a side insulating layer may be disposed between the first input/output contact plug 203 and the first substrate 250 to electrically isolate the first input/output contact plug 203 from the first substrate 250.

An upper insulating layer 401 covering a top surface of the third substrate 410 may be formed on the third substrate 410. A second input/output pad 405 and/or a third input/output pad 406 may be disposed on the upper insulating layer 401. The second input/output pad 405 may be connected to at least one of the plurality of circuit elements 220*a* disposed in the peripheral circuit region PERI through second input/output contact plugs 403 and 303, and the third input/output pad 406 may be connected to at least one of the plurality of circuit elements 220*a* disposed in the peripheral circuit region PERI through third input/output contact plugs 404 and 304.

In some embodiments, the third substrate 410 may not be disposed in a region in which the input/output contact plug is disposed. For example, as illustrated in a region 'B', the third input/output contact plug 404 may be separated from the third substrate 410 in a direction parallel to the top surface of the third substrate 410 and may penetrate an interlayer insulating layer 415 of the second cell region CELL2 so as to be connected to the third input/output pad 406. In this case, the third input/output contact plug 404 may be formed by at least one of various processes.

In some embodiments, as illustrated in a region 'B1', the third input/output contact plug 404 may extend in a third direction (e.g., the Z-axis direction), and a diameter of the third input/output contact plug 404 may become progressively greater toward the upper insulating layer 401. In other words, a diameter of the channel structure CH described in the region 'A1' may become progressively less toward the upper insulating layer 401, but the diameter of the third input/output contact plug 404 may become progressively greater toward the upper insulating layer 401. For example, the third input/output contact plug 404 may be formed after the second cell region CELL2 and the first cell region CELL1 are bonded to each other by the bonding method.

In certain embodiments, as illustrated in a region 132', the third input/output contact plug 404 may extend in the third direction (e.g., the Z-axis direction), and a diameter of the third input/output contact plug 404 may become progressively less toward the upper insulating layer 401. In other words, like the channel structure CH, the diameter of the third input/output contact plug 404 may become progressively less toward the upper insulating layer 401. For example, the third input/output contact plug 404 may be formed together with the cell contact plugs 440 before the second cell region CELL2 and the first cell region CELL1 are bonded to each other.

In certain embodiments, the input/output contact plug may overlap with the third substrate 410. For example, as illustrated in a region 'C', the second input/output contact plug 403 may penetrate the interlayer insulating layer 415 of the second cell region CELL2 in the third direction (e.g., the Z-axis direction) and may be electrically connected to the second input/output pad 405 through the third substrate 410. In this case, a connection structure of the second input/output contact plug 403 and the second input/output pad 405 may be realized by various methods.

In some embodiments, as illustrated in a region 'C1', an opening 408 may be formed to penetrate the third substrate 410, and the second input/output contact plug 403 may be connected directly to the second input/output pad 405 through the opening 408 formed in the third substrate 410. In this case, as illustrated in the region 'C1', a diameter of the second input/output contact plug 403 may become progressively greater toward the second input/output pad 405. However, embodiments of the disclosure are not limited thereto, and in certain embodiments, the diameter of the second input/output contact plug 403 may become progressively less toward the second input/output pad 405.

In certain embodiments, as illustrated in a region 'C2', the opening 408 penetrating the third substrate 410 may be formed, and a contact 407 may be formed in the opening 408. An end of the contact 407 may be connected to the second input/output pad 405, and another end of the contact

407 may be connected to the second input/output contact plug 403. Thus, the second input/output contact plug 403 may be electrically connected to the second input/output pad 405 through the contact 407 in the opening 408. In this case, as illustrated in the region 'C2', a diameter of the contact 407 may become progressively greater toward the second input/output pad 405, and a diameter of the second input/output contact plug 403 may become progressively less toward the second input/output pad 405. For example, the second input/output contact plug 403 may be formed together with the cell contact plugs 440 before the second cell region CELL2 and the first cell region CELL1 are bonded to each other, and the contact 407 may be formed after the second cell region CELL2 and the first cell region CELL1 are bonded to each other.

In certain embodiments illustrated in a region 'C3', a stopper 409 may further be formed on a bottom end of the opening 408 of the third substrate 410, as compared with the embodiments of the region 'C2'. The stopper 409 may be a metal line formed in the same layer as the common source line 420. Alternatively, the stopper 409 may be a metal line formed in the same layer as at least one of the word lines 430. The second input/output contact plug 403 may be electrically connected to the second input/output pad 405 through the contact 407 and the stopper 409.

Like the second and third input/output contact plugs 403 and 404 of the second cell region CELL2, a diameter of each of the second and third input/output contact plugs 303 and 304 of the first cell region CELL1 may become progressively less toward the lower metal pattern 371*e* or may become progressively greater toward the lower metal pattern 371*e*.

Meanwhile, in some embodiments, a slit 411 may be formed in the third substrate 410. For example, the slit 411 may be formed at a certain position of the external pad bonding region PA. For example, as illustrated in a region 'D', the slit 411 may be located between the second input/output pad 405 and the cell contact plugs 440 when viewed in a plan view. Alternatively, the second input/output pad 405 may be located between the slit 411 and the cell contact plugs 440 when viewed in a plan view.

In some embodiments, as illustrated in a region 'D1', the slit 411 may be formed to penetrate the third substrate 410. For example, the slit 411 may be used to prevent the third substrate 410 from being finely cracked when the opening 408 is formed. However, embodiments of the disclosure are not limited thereto, and in certain embodiments, the slit 411 may be formed to have a depth ranging from about 60% to about 70% of a thickness of the third substrate 410.

In certain embodiments, as illustrated in a region 'D2', a conductive material 412 may be formed in the slit 411. For example, the conductive material 412 may be used to discharge a leakage current occurring in driving of the circuit elements in the external pad bonding region PA to the outside. In this case, the conductive material 412 may be connected to an external ground line.

In certain embodiments, as illustrated in a region 'D3', an insulating material 413 may be formed in the slit 411. For example, the insulating material 413 may be used to electrically isolate the second input/output pad 405 and the second input/output contact plug 403 disposed in the external pad bonding region PA from the word line bonding region WLBA. Since the insulating material 413 is formed in the slit 411, it is possible to prevent a voltage provided through the second input/output pad 405 from affecting a metal layer disposed on the third substrate 410 in the word line bonding region WLBA.

Meanwhile, in certain embodiments, the first to third input/output pads 205, 405 and 406 may be selectively formed. For example, the memory device 500 may be realized to include only the first input/output pad 205 disposed on the first substrate 250, to include only the second input/output pad 405 disposed on the third substrate 410, or to include only the third input/output pad 406 disposed on the upper insulating layer 401.

In some embodiments, at least one of the second substrate 310 of the first cell region CELL1 or the third substrate 410 of the second cell region CELL2 may be used as a sacrificial substrate and may be completely or partially removed before or after a bonding process. An additional layer may be stacked after the removal of the substrate. For example, the second substrate 310 of the first cell region CELL1 may be removed before or after the bonding process of the peripheral circuit region PERI and the first cell region CELL1, and then, an insulating layer covering a top surface of the common source line 320 or a conductive layer for connection may be formed. Likewise, the third substrate 410 of the second cell region CELL2 may be removed before or after the bonding process of the first cell region CELL1 and the second cell region CELL2, and then, the upper insulating layer 401 covering a top surface of the common source line 420 or a conductive layer for connection may be formed.

According to example embodiments, At least one of the components, elements, modules and units (collectively "components" in this paragraph) represented by a block in the drawings may use a direct circuit structure, such as a processor, a logic circuit, a look-up table, etc. that may execute the respective functions through controls of one or more microprocessors or other control apparatuses. These components may include the memory controller 210, the control logic 620, etc. shown in FIGS. 1-13 and 18, not being limited thereto. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU), a microprocessor, or the like that performs the respective functions.

While the disclosure has been particularly shown and described with reference to embodiments thereof, it will be understood that various changes in form and details may be made therein without departing from the spirit and scope of the following claims.

What is claimed is:

1. A method of operating a storage system comprising a host device and a storage device, the method comprising:

transmitting, by the host device, a first write command and a logical address to the storage device;

transmitting, by the storage device, first normal offset information about a normal area included in a host memory of the host device and first cache offset information about a cache area included in the host memory of the host device, to the host device;

copying, by the host device, first write data stored in the normal area corresponding to the first normal offset information to the cache area corresponding to the first cache offset information and transmitting a first data-out command to the storage device; and transmitting, by the storage device, a first response to the first write command to the host device based on reception of the first data-out command, wherein reception of the first write data, from the host device at the storage device before transmitting the first response, is omitted.

2. The method of claim 1, further comprising:

mapping, by the storage device, the logical address, the first normal offset information, and the first cache offset information to one another.

3. The method of claim 2, further comprising:

providing, by the host device, a second write command and the logical address to the storage device;

transmitting, by the storage device, second cache offset information about the cache area to the host device;

copying, by the host device, second write data stored in the normal area to the cache area based on the second cache offset information and transmitting a second data-out command to the storage device;

mapping, by the storage device, the logical address and the second cache offset information to each other; and transmitting, by the storage device, a second response to the second write command to the host device based on reception of the second data-out command, wherein reception of the second write data, from the host device before transmitting the second response, is omitted.

4. The method of claim 1, further comprising transmitting, by the host device, the first write data stored in the cache area to the storage device after the storage device transmits the first response to the host device.

5. The method of claim 1, further comprising, after transmitting the first response to the host device:

requesting, by the storage device, the first write data from the host device; and transmitting, by the host device, the first write data to the storage device.

6. The method of claim 1, wherein the copying the first write data stored in the normal area to the cache area comprises merging, based on a program unit, a first piece of the first write data with a second piece of the first write data to form the first write data in the normal area, and copying the merged first write data to the cache area.

7. The method of claim 1, wherein the copying the first write data stored in the normal area to the cache area comprises merging, based on a stream identifier, a first piece of the first write data with a second piece of the first write data to form the first write data in the normal area, and copying the merged first write data to the cache area.

8. The method of claim 1, further comprising:

providing, by the host device, the logical address and a read command to the storage device;

providing, by the storage device, the first cache offset information to the host device;

copying, by the host device, the first write data stored in the cache area to the normal area based on the first cache offset information; and providing, by the storage device, a third response to the read command to the host device, wherein reading the first write data from a memory cell array included in the storage device before providing the third response is omitted.

9. The method of claim 8, further comprising transmitting, by the storage device, length information indicating a size of the first write data to be copied from the cache area to the host device, wherein the copying the first write data stored in the cache area to the normal area comprises copying, by the host device, the first write data from the cache area to the normal area based on the first cache offset information and the length information.

10. The method of claim 1, further comprising transmitting, by the storage device, length information indicating a size of the first write data to be copied from the normal area to the host device, wherein the copying the first write data stored in the normal area to the cache area comprises copying, by the host device, the first write data from the normal area to the cache area based on the first normal offset information and the length information.

11. A storage system comprising:

a host device comprising a memory comprising a normal area and a cache area; and a storage device comprising a memory cell array, configured to receive a write command and a logical address from the host device, and transmit first address information about the cache area to the host device, wherein the host device is configured to copy write data stored in the normal area within the host device to the cache area corresponding to the first address information, wherein the storage device is configured to transmit a response to the write command to the host device before receiving the write data from the host device.

12. The storage system of claim 11, wherein the storage device is configured to transmit second address information about the normal area to the host device, wherein the host device is configured to copy the write data stored in a location in the normal area indicated by the second address information to a location in the cache area indicated by the first address information.

13. The storage system of claim 11, wherein the storage device is configured to receive the logical address and read command from the host device, transmit the first address information to the host device, omits an operation of reading the write data from the memory cell array, and transmit a response corresponding to the read command to the host device, wherein the host device is configured to copy the write data from the cache area to the normal area based on the first address information.

14. The storage system of claim 11, wherein the storage device is configured to store a table representing a mapping relationship between a logical address and the first address information.

15. The storage system of claim 11, wherein the host device is configured to merge first write data and second write data to from the write data stored in the normal area based on a program unit, and copy the merged write data to the cache area.

16. The storage system of claim 11, wherein the host device is configured to merge first write data and second write data to form the write data stored in the normal area based on a stream identifier, and copy the merged write data to the cache area.

17. The storage system of claim 11, wherein the storage device is configured to request the write data from the host device after transmitting the response to the host device, wherein the host device is configured to transmit the write data stored in the cache area to the storage device in response to the request.

18. The storage system of claim 17, wherein the storage device is configured to request the write data from the host device during an idle time determined based on at least one of a data rate between the host device and the storage device, a reference clock signal of the host device, an amount of data traffic in a predetermined time unit between the host device and the host device, and a predetermined time after the storage device transmits the response to the write command to the host device.

19. A method of operating a storage system comprising a host device and a storage device, the method comprising:

transmitting, by the host device, a first read command and a logical address to the storage device;

transmitting, by the storage device, first normal offset information about a normal area included in a host memory of the host device, first cache offset information about a cache area included in the host memory of the host device, and read data in the cache area to the host device;

storing, by the host device, the read data in the normal area corresponding to the first normal offset information and in the cache area corresponding to the first cache offset information;

transmitting, by the host device, a second read command and the logical address to the storage device;

transmitting, by the storage device, the first cache offset information to the host device; and copying, by the host device, the read data stored in the cache area corresponding to the first cache offset information to the normal area.

20. The method of claim 19, further comprising updating, by the storage device, a mapping relationship between a logical address and the first cache offset information after the host device stores the read data in the normal area.

* * * * *